US012523943B2

(12) United States Patent
Tokimitsu et al.

(10) Patent No.: US 12,523,943 B2
(45) Date of Patent: Jan. 13, 2026

(54) ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

(71) Applicant: CANON KABUSHIKI KAISHA, Tokyo (JP)

(72) Inventors: Ryoichi Tokimitsu, Chiba (JP); Haruhiko Mitsuda, Chiba (JP); Jun Ohira, Ibaraki (JP); Toshiyasu Shirasuna, Shizuoka (JP); Ikuyo Kuroiwa, Tokyo (JP); Tsuyoshi Shimada, Chiba (JP); Takanori Ueno, Kanagawa (JP); Kenichi Ikari, Chiba (JP); Eileen Takeuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 18/156,611

(22) Filed: Jan. 19, 2023

(65) Prior Publication Data

US 2023/0259045 A1 Aug. 17, 2023

(30) Foreign Application Priority Data

Feb. 14, 2022 (JP) ................................ 2022-020568

(51) Int. Cl.

| | |
|---|---|
| ***G03G 5/07*** | (2006.01) |
| ***G03G 5/05*** | (2006.01) |
| ***G03G 5/147*** | (2006.01) |

(52) U.S. Cl.

CPC ........... *G03G 5/071* (2013.01); *G03G 5/0564* (2013.01); *G03G 5/14726* (2013.01); *G03G 5/14791* (2013.01)

(58) Field of Classification Search

CPC ................ G03G 5/071; G03G 5/0564; G03G 5/14726; G03G 5/14791

See application file for complete search history.

(56) References Cited

U.S. PATENT DOCUMENTS

| | | | |
|---|---|---|---|
| 7,229,730 | B2 | 6/2007 | Ohira |
| 7,229,731 | B2 | 6/2007 | Aoki |
| 9,594,318 | B2 | 3/2017 | Nakata |

(Continued)

FOREIGN PATENT DOCUMENTS

| | | | |
|---|---|---|---|
| JP | 6-332219 | A | 12/1994 |
| JP | 2009-104145 | A | 5/2009 |

(Continued)

OTHER PUBLICATIONS

U.S. Appl. No. 18/051,584, Haruki Mori, filed Nov. 1, 2022.

(Continued)

*Primary Examiner* — Mark F. Huff
*Assistant Examiner* — Boone Alexander Evans
(74) *Attorney, Agent, or Firm* — VENABLE LLP

(57) ABSTRACT

An electrophotographic photosensitive member includes a surface layer which exhibits excellent dispersibility of fluorine atom-containing resin particles, and suppresses the occurrence of ghost images. The surface layer contains a fluorine atom-containing resin particle, a binder material, and a polymer A having specific structural units.

16 Claims, 5 Drawing Sheets

(56) References Cited

U.S. PATENT DOCUMENTS

| | | | |
|---|---|---|---|
| 9,766,561 | B2 | 9/2017 | Takahashi |
| 9,811,012 | B2 | 11/2017 | Murakami |
| 9,817,324 | B2 | 11/2017 | Kitamura |
| 9,971,258 | B2 | 5/2018 | Kitamura |
| 9,983,490 | B2 | 5/2018 | Shimada |
| 10,241,429 | B2 | 3/2019 | Shimada |
| 10,310,395 | B2 | 6/2019 | Nakata |
| 10,338,486 | B2 | 7/2019 | Abe |
| 10,353,340 | B2 | 7/2019 | Kuroiwa |
| 10,359,729 | B2 | 7/2019 | Ichihashi |
| 10,365,569 | B2 | 7/2019 | Tokimitsu |
| 10,488,770 | B2 | 11/2019 | Kuroiwa |
| 10,642,175 | B2 | 5/2020 | Ohira |
| 10,705,440 | B2 | 7/2020 | Ueno |
| 10,705,441 | B1 | 7/2020 | Fujij |
| 10,838,314 | B2 | 11/2020 | Ikezue |
| 10,921,723 | B2 | 2/2021 | Takizawa |
| 10,969,703 | B2 | 4/2021 | Takeuchi |
| 10,976,677 | B2 | 4/2021 | Tokimitsu |
| 11,112,706 | B2 | 9/2021 | Takeuchi |
| 11,169,453 | B2 | 11/2021 | Takeuchi |
| 11,204,560 | B2 | 12/2021 | Tokimitsu |
| 11,269,282 | B2 | 3/2022 | Ikari |
| 11,556,082 | B2 | 1/2023 | Tsuruga |
| 2008/0199795 | A1 | 8/2008 | Ogaki |
| 2009/0180800 | A1* | 7/2009 | Uesugi ............... G03G 5/14726 430/96 |
| 2020/0233322 | A1* | 7/2020 | Choda .................... G03G 5/047 |
| 2021/0080843 | A1 | 3/2021 | Sasaki |
| 2021/0302847 | A1 | 9/2021 | Ichihashi |

FOREIGN PATENT DOCUMENTS

| | | | |
|---|---|---|---|
| JP | 2012-189715 | A | 10/2012 |
| JP | 2020-129058 | A | 8/2020 |
| JP | 2021-47236 | A | 3/2021 |

OTHER PUBLICATIONS

U.S. Appl. No. 18/161,113, Haruhiko Mitsuda, filed Jan. 30, 2023.

U.S. Appl. No. 18/161,115, Toshiyasu Shirasuna, filed Jan. 30, 2023.

U.S. Appl. No. 18/161,328, Jun Ohira, filed Jan. 30, 2023.

* cited by examiner

ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

BACKGROUND OF THE INVENTION

Field of the Invention

The present disclosure relates to an electrophotographic photosensitive member, a process cartridge including the electrophotographic photosensitive member, an electrophotographic apparatus including the electrophotographic photosensitive member, and a method of producing an electrophotographic photosensitive member.

Description of the Related Art

As an electrophotographic photosensitive member to be mounted onto an electrophotographic apparatus, there is widely used an electrophotographic photosensitive member containing an organic photoconductive substance (charge-generating substance). In recent years, an improvement in mechanical durability (wear resistance) of the electrophotographic photosensitive member has been required for the purposes of lengthening the lifetime of the electrophotographic photosensitive member and improving image quality at the time of its repeated use.

An example of a technology of improving the wear resistance of the electrophotographic photosensitive member is a method including incorporating fluorine atom-containing resin particles into the surface layer of the electrophotographic photosensitive member to reduce friction between the surface layer and a contact member such as a cleaning blade. In Japanese Patent Application Laid-Open No. H06-332219, there is a disclosure of a technology including forming a surface layer through use of a dispersion liquid of fluorine atom-containing resin particles such as polytetrafluoroethylene resin particles as a coating liquid for a surface layer.

In addition, at the time of the preparation of the dispersion liquid of the fluorine atom-containing resin particles, there has been known a method including using a (meth)acrylic polymer containing a fluorine atom as a dispersant for the purpose of improving the dispersibility of the fluorine atom-containing resin particles. In each of Japanese Patent Application Laid-Open No. 2012-189715, Japanese Patent Application Laid-Open No. 2009-104145, and Japanese Patent Application Laid-Open No. 2020-129058, there is a disclosure of a technology of improving the dispersibility of the fluorine atom-containing resin particles through use of a fluorine atom-containing (meth)acrylic polymer having a specific structure as a dispersant.

In Japanese Patent Application Laid-Open No. 2021-47236, there is a disclosure of an electrophotographic photosensitive member including an outermost surface layer containing a fluorine-based graft polymer and fluorine-containing resin particles, in which the fluorine-based graft polymer contains a structural unit having an acidic group having a pKa of 3 or less.

SUMMARY OF THE INVENTION

However, in each of the technologies disclosed in Japanese Patent Application Laid-Open No. 2012-189715, Japanese Patent Application Laid-Open No. 2009-104145, and Japanese Patent Application Laid-Open No. 2020-129058, an electrophotographic photosensitive member including a surface layer excellent in dispersibility of the fluorine atom-containing resin particles is obtained, but at the time of repeated use of the electrophotographic photosensitive member, the occurrence of a ghost image cannot be sufficiently suppressed in some cases. Accordingly, the technologies have each been susceptible to improvement in terms of suppression of the occurrence of a ghost image at the time of the repeated use of the electrophotographic photosensitive member.

One aspect of the present disclosure is directed to provide an electrophotographic photosensitive member that is suppressed from causing a ghost image at the time of its repeated use.

In addition, another aspect of the present disclosure is directed to provide a process cartridge including the electrophotographic photosensitive member and an electrophotographic apparatus including the process cartridge.

In addition, another aspect of the present disclosure is directed to provide a method of producing the electrophotographic photosensitive member.

According to one aspect of the present invention, there is provided an electrophotographic photosensitive member including a surface layer, wherein the surface layer contains a fluorine atom-containing resin particle, a binder material, and a polymer A, and wherein the polymer A is a polymer obtained by polymerizing a composition containing a compound represented by the following formula (1), a compound represented by the following formula (2), and a compound represented by the following formula (3):

(1)

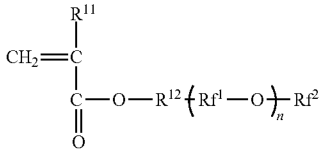

in the formula (1), $R^{11}$ represents a hydrogen atom or a methyl group, $R^{12}$ represents a single bond, a methylene group, or an ethylene group, $Rf^1$s each independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, and "n" represents an integer of from 1 to 3, and when "n" represents 2 or 3, "n" $Rf^1$s may be identical to or different from each other;

(2)

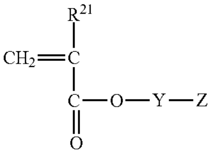

in the formula (2), $R^{21}$ represents a hydrogen atom or a methyl group, Y represents a divalent organic group, and Z represents a polymer moiety;

(3)

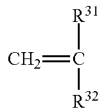

in the formula (3), $R^{31}$ represents a hydrogen atom or a methyl group, and $R^{32}$ represents a phenyl group, a cyano group, or a group represented by the following formula (4);

(4)

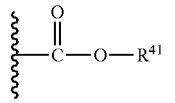

in the formula (4), $R^{41}$ represents an alkyl group having 1 to 4 carbon atoms.

In addition, according to another aspect of the present disclosure, there is provided a process cartridge including: the electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus.

In addition, according to another aspect of the present disclosure, there is provided an electrophotographic apparatus including: the electrophotographic photosensitive member; a charging unit; an exposing unit; a developing unit; and a transfer unit.

In addition, according to another aspect of the present disclosure, there is provided a method of producing the electrophotographic photosensitive member.

Further features of the present invention will become apparent from the following description of exemplary embodiments with reference to the attached drawings.

DESCRIPTION OF THE EMBODIMENTS

Figure 1:
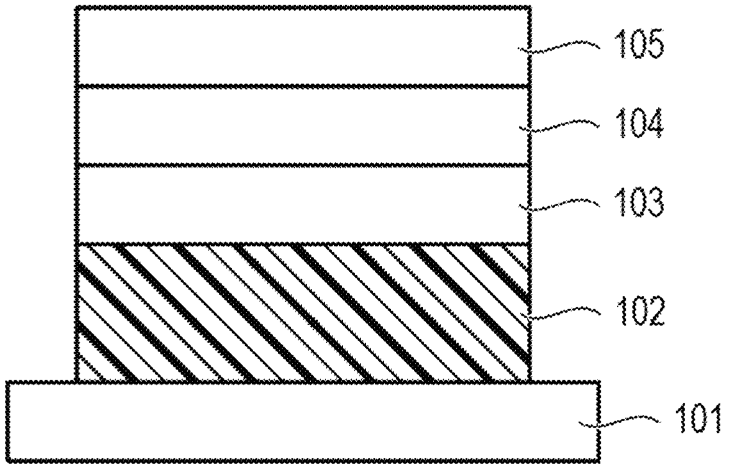
FIG. 1 is a schematic view for illustrating an example of the configuration of an electrophotographic photosensitive member of the present disclosure.

The inventors have made an investigation, and as a result, have found that when a fluorine atom-containing resin particle and a polymer A, which is obtained by polymerizing a composition containing a compound represented by the formula (1), a compound represented by the formula (2), and a compound represented by the formula (3), are incorporated into the surface layer of an electrophotographic photosensitive member, there is obtained an electrophotographic photosensitive member, which is excellent in dispersibility of the fluorine atom-containing resin particles in its surface layer, and is suppressed from causing a ghost image.

That is, the present disclosure provides an electrophotographic photosensitive member including a surface layer, wherein the surface layer contains a fluorine atom-containing resin particle, a binder material, and a polymer A, and wherein the polymer A is a polymer obtained by polymerizing a composition containing a compound represented by the following formula (1), a compound represented by the following formula (2), and a compound represented by the following formula (3):

(1)

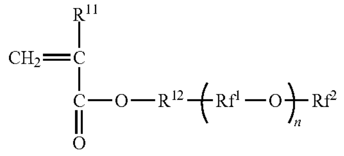

in the formula (1), $R^{11}$ represents a hydrogen atom or a methyl group, $R^{12}$ represents a single bond, a methylene group, or an ethylene group, $Rf^1$s each independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, and "n" represents an integer of from 1 to 3, and when "n" represents 2 or 3, "n" Res may be identical to or different from each other;

(2)

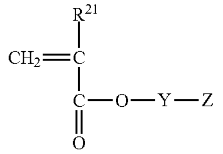

in the formula (2), $R^{21}$ represents a hydrogen atom or a methyl group, Y represents a divalent organic group, and Z represents a polymer moiety;

(3)

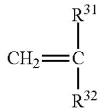

in the formula (3), $R^{31}$ represents a hydrogen atom or a methyl group, and $R^{32}$ represents a phenyl group, a cyano group, or a group represented by the following formula (4);

(4)

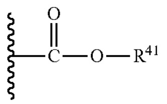

in the formula (4), $R^{41}$ represents an alkyl group having 1 to 4 carbon atoms.

The present disclosure also provides a method of producing an electrophotographic photosensitive member including a surface layer, the method including: preparing a coating liquid for a surface layer containing a fluorine atom-containing resin particle, at least one selected from a binder material and a raw material for the binder material, and a polymer A obtained by copolymerizing the compound represented by the formula (1), the compound represented by the formula (2), and the compound represented by the formula (3); and forming the surface layer by forming a coating film of the coating liquid for a surface layer, and drying and/or curing the coating film.

Although a case in which the polymer A has a structural unit having an acidic group having a pKa of 3 or less is not excluded, the polymer is preferably free of such structural unit.

The pKa of the acidic group may be determined by measurement including using a known method such as titration. Examples of the acidic group having a pKa of 3 or less include a sulfonic acid group (methanesulfonic acid: −2.6), a phosphonic acid group (first dissociation: 1.5), a phosphoric acid group (first dissociation: 2.12), and a fluoroalkyl carboxylic acid group (e.g., trifluoroacetic acid: −0.25, difluoroacetic acid: 1.24, or monofluoroacetic acid: 2.66).

Herein, the inventors have conceived that the structure represented by the formula (1) serves as a dispersant for the fluorine atom-containing resin particles in the step of preparing a coating liquid for a surface layer for forming the surface layer of the electrophotographic photosensitive member.

The inventors have assumed the reason why the electrophotographic photosensitive member of the present disclosure is excellent in dispersibility of the fluorine atom-containing resin particles in the surface layer, and is excellent in suppressing effect on the occurrence of a ghost image at the time of its repeated use to be as described below.

An electrophotographic photosensitive member including a surface layer containing fluorine atom-containing resin particles and a dispersant tends to be liable to cause a ghost image at the time of its repeated use. This is probably because charge is liable to accumulate in the fluorine atom-containing resin particles incorporated into the surface layer.

The inventors have made an investigation, and as a result, have found that at the time of the incorporation of a polymer having a structural unit including a $—(CF_2)_n—$ chain into the surface layer, when an oxygen atom is caused to be present between the $—(CF_2)_n—$ chain and another $—(CF_2)_n—$ chain, a suppressing effect on the remaining of the charge of the fluorine atom-containing resin particles is obtained. However, when a polymer obtained by copolymerizing macromonomers is used for imparting the dispersibility of the fluorine atom-containing resin particles, a suppressing effect on the occurrence of a ghost image is not sufficiently obtained, though the dispersibility of the fluorine atom-containing resin particles is improved. This is assumed to be because of the weakening of the adhesion of the $—(CF_2)_n—$ chain to the fluorine atom-containing resin particles caused as follows: when the oxygen atom is caused to be present between the $—(CF_2)_n—$ chain and the other $—(CF_2)_n—$ chain, the adhesion force thereof to the fluorine atom-containing resin particles weakens as compared to that when no oxygen atom is present, and hence a macromonomer moiety in the copolymer starts to adhere to the fluorine atom-containing resin particles.

In view of the foregoing, the inventors have made a further investigation, and as a result, have found that when a copolymer obtained by further polymerizing the compound represented by the formula (3) in addition to the compounds represented by the formulae (1) and (2) is incorporated into the surface layer, there is obtained an electrophotographic photosensitive member, which is suppressed from causing the remaining of charge, and is suppressed from causing a ghost image at the time of its repeated use.

The inventors have assumed the reason for the foregoing to be as described below. That is, the moiety of the compound represented by the formula (3) had a short side chain, and hence a spatial gap was formed in the polymer. Thus, the movement of a molecule in the polymer was facilitated to overcome steric limitations in the polymer. As a result, the $—(CF_2)_n—$ chain having a high affinity for the fluorine atom-containing resin particles in an energetically stable state finally adhered to the fluorine atom-containing resin particles.

In addition, $Rf^1$ in the formula (1) represents a perfluoroalkylene group or a perfluoroalkylidene group. The inventors have found that when the number of the carbon atoms of each of the groups is from 1 to 5, a ghost-suppressing effect is obtained. The inventors have assumed that when the number of the carbon atoms of the perfluoroalkylene group or the perfluoroalkylidene group described above is more than 5, the remaining of charge occurs in the perfluoroalkylene group or the perfluoroalkylidene group to preclude the obtainment of a suppressing effect on charge trapping through an oxygen atom. In the formula (1), $Rf^2$ represents a perfluoroalkyl group. The inventors have found that when the number of the carbon atoms of the group is from 1 to 5, a ghost-suppressing effect is obtained. The inventors have assumed that when the number of the carbon atoms of the above-mentioned perfluoroalkyl group is more than 5, the remaining of charge occurs in the perfluoroalkyl group to preclude the obtainment of a suppressing effect on charge trapping through an oxygen atom.

In addition, the inventors have found that when Rig in the formula (1) represents a single bond, a methylene group, or an ethylene group, a ghost-suppressing effect is obtained. A difference in surface energy between a structural unit represented by the formula (1) and the fluorine atom-containing resin particles may become smaller to facilitate the adhesion of the structural unit to the fluorine atom-containing resin particles, to thereby suppress the remaining of the charge of the fluorine atom-containing resin particles.

<Fluorine Atom-Containing Resin Particle>

The surface layer of the electrophotographic photosensitive member of the present disclosure contains the fluorine atom-containing resin particle.

The content of the fluorine atom-containing resin particle in the surface layer is preferably from 5 mass % to 40 mass %.

When the protective layer of the electrophotographic photosensitive member is the surface layer, the content of the fluorine atom-containing resin particle is preferably from 20 mass % to 40 mass %, more preferably from 25 mass % to 35 mass % with respect to the protective layer.

When the photosensitive layer of the electrophotographic photosensitive member is a laminate type photosensitive layer, and the charge-transporting layer thereof is the surface layer, the content of the fluorine atom-containing resin particle is preferably from 5 mass % to 15 mass %, more preferably from 7 mass % to 10 mass % with respect to the charge-transporting layer.

When the photosensitive layer of the electrophotographic photosensitive member is a monolayer type photosensitive layer, and the photosensitive layer is the surface layer, the content of the fluorine atom-containing resin particle is preferably from 5 mass % to 15 mass % with respect to the photosensitive layer.

Examples of a resin to be incorporated into the fluorine atom-containing resin particles to be used in the present disclosure include a polytetrafluoroethylene resin, a polychlorotrifluoroethylene resin, a polytetrafluoroethylene propylene resin, a polyvinyl fluoride resin, a polyvinylidene fluoride resin, and a polydichlorodifluoroethylene resin. In addition, particles containing a plurality of kinds of the above-mentioned resins are also preferably used. Of those, a polytetrafluoroethylene resin is more preferred as the fluorine atom-containing resin particles from the viewpoint of an improvement in dispersibility of the particles.

In the observation of a section of the surface layer with a scanning electron microscope, the arithmetic average of the long diameters of primary particles (average primary particle diameter) measured from a secondary electron image of the fluorine atom-containing resin particles obtained with the scanning electron microscope is preferably from 150 nm to 300 nm from the viewpoints of an improvement in dispersibility of the particles and the suppression of the occurrence of a ghost image. Further, the average primary particle diameter of the fluorine atom-containing resin particles is more preferably from 180 nm to 250 nm.

The average of circularities (average circularity) calculated from the areas and perimeters of the primary particles measured from the secondary electron image of the fluorine atom-containing resin particles obtained with the scanning electron microscope is preferably 0.75 or more.

To cause the measured values of the average primary particle diameter and average circularity of the fluorine atom-containing resin particles in the surface layer of the electrophotographic photosensitive member of the present disclosure to fall within the above-mentioned ranges, such fluorine atom-containing resin particles that the values of their average primary particle diameter and average circularity measured and calculated by the following methods fall within the ranges may be used.

(Methods of Measuring Average Primary Particle Diameter and Average Circularity)

That is, in each of Examples of the present disclosure, the average particle diameter and average circularity of fluorine atom-containing resin particles to be incorporated into the surface layer of an electrophotographic photosensitive member were measured with a field emission scanning electron microscope (FE-SEM) as described below. The fluorine atom-containing resin particles were caused to adhere to a commercial carbon electroconductive tape, and the fluorine atom-containing resin particles that did not adhere to the electroconductive tape were removed with compressed air, followed by the deposition of platinum from the vapor onto the remaining particles. The fluorine atom-containing resin particles having deposited thereonto platinum were observed with an FE-SEM manufactured by Hitachi High-Technologies Corporation (S-4700). Conditions for the measurement with the FE-SEM are as described below.

Acceleration voltage: 2 kV

WD: 5 mm

Magnification: 20,000

Number of pixels: 1,280 pixels in a longitudinal direction and 960 pixels in a lateral direction (size per pixel: 5 nm)

The Feret diameters of 100 particles were determined from the resultant image with ImageJ (open source software manufactured by the National Institutes of Health (NIH)), and their average was calculated and used as the average particle diameter.

In addition, the areas and perimeters of the particles were similarly determined, and the circularities thereof were determined from the following equation (II). The average of the circularities was calculated and used as the average circularity.

$$\text{Circularity}=4\times\pi\times(\text{area})/(\text{square of perimeter}) \qquad \text{Equation (II)}$$

The fluorine atom-containing resin particles of the present disclosure may be used alone or in combination thereof.

<Binder Material>

The surface layer of the electrophotographic photosensitive member of the present disclosure contains the binder material.

When the protective layer of the electrophotographic photosensitive member is the surface layer, the binder material is a cured film obtained by polymerizing a composition containing a monomer having a polymerizable functional group, and the monomer having a polymerizable functional group is a raw material for the binder material. The raw material for the binder material is, for example, the monomer having a polymerizable functional group. Examples of the polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a group having a carbon-carbon double bond. Examples of the group having a carbon-carbon double bond include an acryloyl group and a methacryloyl group. A monomer having a charge-transporting ability is preferably a monomer that is a compound represented by the formula (CT-1) or (CT-2) to be described later.

When the photosensitive layer of the electrophotographic photosensitive member is a laminate type photosensitive layer, and the charge-transporting layer thereof is the surface layer, the binder material is a thermoplastic resin. Examples of the thermoplastic resin include a polyester resin, a polycarbonate resin, an acrylic resin, and a polystyrene resin. Of those, a polycarbonate resin and a polyester resin are preferred. A polyarylate resin is particularly preferred as the polyester resin.

When the photosensitive layer of the electrophotographic photosensitive member is a monolayer type photosensitive layer, and the photosensitive layer is the surface layer, the binder material is a thermoplastic resin. Examples of the thermoplastic resin include a polyester resin, a polycarbonate resin, an acrylic resin, and a polystyrene resin. Of those, a polycarbonate resin and a polyester resin are preferred. A polyarylate resin is particularly preferred as the polyester resin.

<Compound Represented by Formula (1)>

The surface layer of the electrophotographic photosensitive member of the present disclosure contains the polymer A of the composition containing the compound represented by the following formula (1).

(1)

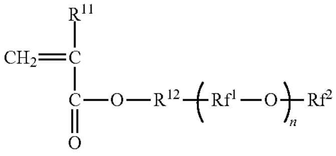

In the formula (1), $R^{11}$ represents a hydrogen atom or a methyl group. $R^{12}$ represents one of a single bond, a methylene group, or an ethylene group. When $R^{12}$ represents an alkylene group having a large number of carbon atoms, a difference in surface energy between the polymer A and the fluorine atom-containing resin particles becomes larger. Accordingly, the polymer and the particles hardly adhere to each other in a sufficient manner, and hence the dispersibility of the particles is liable to be insufficient. Further, $R^{12}$ more preferably represents a methylene group from the viewpoint of the dispersibility.

"n" $Rf^1$s each independently represent a perfluoroalkylene group having 1 to 5 carbon atoms, or a perfluoroalkylidene group having 1 to 5 carbon atoms. $Rf^2$ represents a perfluoroalkyl group having 1 to 5 carbon atoms. When the number of the carbon atoms of each of $Rf^1$ and $Rf^2$ is set to 6 or more, the accumulation of charge in the fluorine atom-containing resin particles cannot be sufficiently suppressed, and hence the occurrence of a ghost image cannot be sufficiently suppressed at the time of the repeated use of the electrophotographic photosensitive member.

In addition, in the formula (1), the total of the number of the carbon atoms of "n" $Rf^1$s and the number of the carbon atoms of $Rf^2$ is preferably from 5 to 8.

In addition, it is preferred that in the formula (1), $Rf^1$ represent a perfluoroalkylene group having 2 or 3 carbon atoms, or a perfluoroalkylidene group having 2 or 3 carbon atoms, and $Rf^2$ represent a perfluoroalkyl group having 2 or 3 carbon atoms.

"n" represents an integer of from 1 to 3, and when "n" represents 2 or more, "n" $Rf^1$s may be identical to or different from each other. Further, in the formula (1), "n" more preferably represents 1 or 2.

Examples of the compound represented by the formula (1) to be used in the present disclosure include structures represented by the following formula (1-1) to formula (1-14).

(1-1)

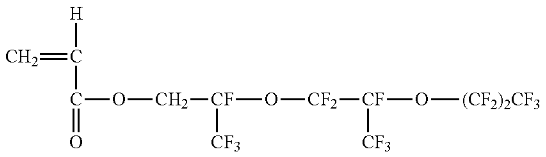

(1-2)

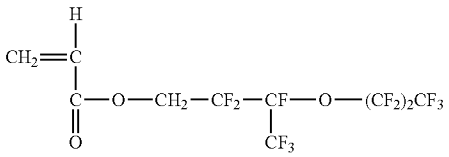

-continued (1-3)

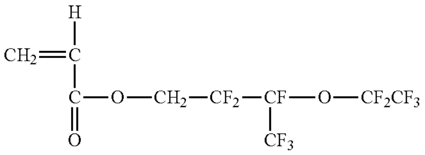

(1-4)

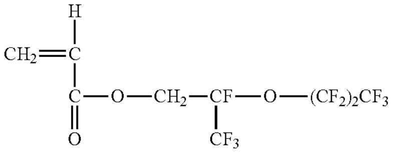

(1-5)

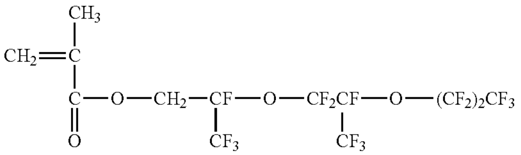

(1-6)

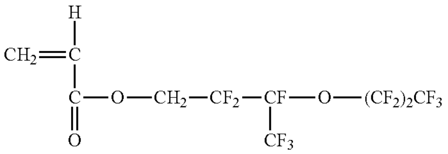

(1-7)

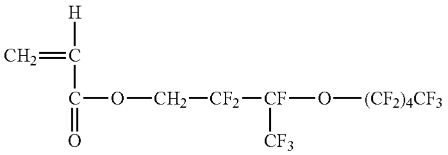

(1-8)

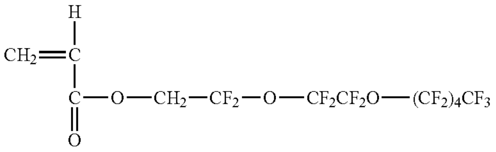

(1-9)

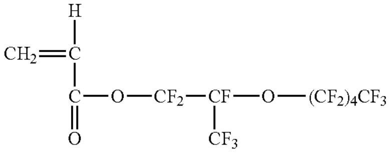

(1-10)

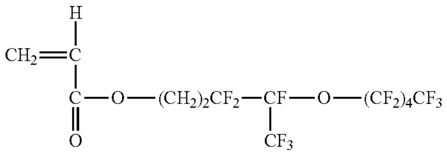

(1-11)

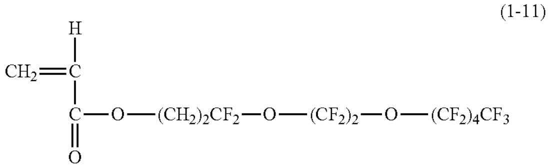

-continued (1-12)

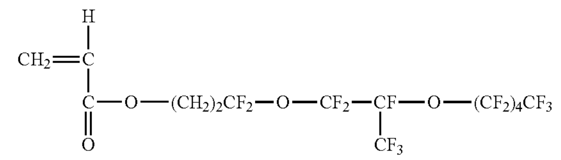

(1-13)

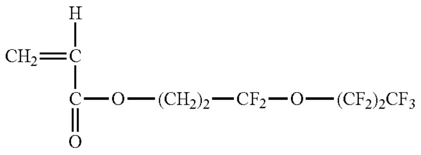

(1-14)

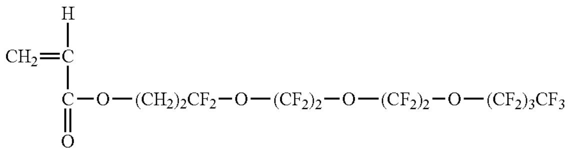

<Compound Represented by Formula (2)>

The surface layer of the electrophotographic photosensitive member of the present disclosure contains the polymer A of the composition containing the compound represented by the following formula (2).

(2)

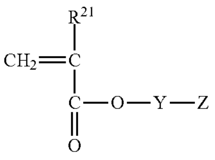

In the formula (2), $R^{21}$ represents a hydrogen atom or a methyl group. Y represents a divalent organic group. Z represents a polymer moiety.

—Y—Z in the formula (2) is preferably free of an acidic group having a pKa of 3 or less.

—Y—Z in the formula (2) is preferably free of $—SO_3H$.

Z in the formula (2) preferably represents a polymer moiety having a structural unit represented by the following formula (b-1). Z preferably has the 25 to 150 structural units each represented by the formula (b-1) in total.

(b-1)

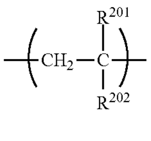

In the formula (b-1), $R^{201}$ represents a hydrogen atom or a methyl group, and $R^{202}$ represents a structure represented by the following formula (2A), a cyano group, or a phenyl group.

(2A)

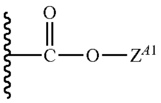

In the formula (2A), $Z^{A1}$ represents an alkyl group having 1 to 4 carbon atoms.

A terminal stopper may be used at the terminal of the polymer moiety represented by Z in the formula (2), or the terminal may have a hydrogen atom.

The compound represented by the formula (2) is preferably a compound represented by the following formula (5).

(5)

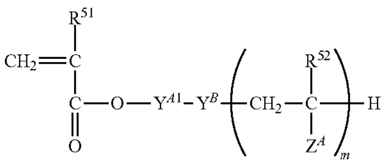

In the formula (5), $Y^{A1}$ represents an unsubstituted alkylene group, $Y^{B}$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds selected from these groups and bonds, and —O— or —S—, or a single bond, $Z^{A}$ represents the structure represented by the formula (2A), a cyano group, or a phenyl group, $R^{51}$ and $R^{52}$ each represent a hydrogen atom or a methyl group, and "m" represents an integer of from 25 to 150.

When $Y^{B}$ in the formula (5) represents an ester bond, $—Y^{A1}—Y^{B}—CH_2—$ may be any one of $—Y^{A1}—CO—O—CH_2—$ and $—Y^{A1}—O—CO—CH_2—$, and is preferably $—Y^{A1}—CO—O—CH_2—$. In addition, when $Y^{B}$ in the formula (5) represents an amide bond, $—Y^{A1}—Y^{B}—CH_2—$ may be any one of $—Y^{A1}—NH—CO—CH_2—$ and $—Y^{A1}—CO—NH—CH_2—$, and is preferably $—Y^{A1}—NH—CO—CH_2—$. In addition, when $Y^{B}$ in the formula (5) represents a urethane bond, $—Y^{A1}—Y^{B}—CH_2—$ may be any one of $—Y^{A1}—NH—CO—O—CH_2—$ and $—Y^{A1}—O—CO—NH—CH_2—$, and is preferably $—Y^{A1}—NH—CO—O—CH_2—$.

$—Y^{A1}—Y^{B}—$ in the formula (5) is preferably a structure represented by $—Y^{A1}—(Y^{A2})_b—(Y^{A3})_c—(Y^{A4})_d—(Y^{A5})_e—(Y^{A6})_f—$.

$Y^{A1}$ represents an unsubstituted alkylene group, $Y^{A2}$ represents a methylene group substituted with at least one selected from the group consisting of: a hydroxy group; and a halogen atom, $Y^{A3}$ represents an unsubstituted alkylene group, $Y^{A4}$ represents an ester bond, an amide bond, or a urethane bond, $Y^{A5}$ represents an unsubstituted alkylene group, $Y^{A6}$ represents an oxygen atom or a sulfur atom, and "b", "c", "d", "e", and "f" each independently represent 0 or 1. Examples of the alkylene group include a methylene group, an ethylene group, a propylene group, a butylene group, a pentylene group, and a hexylene group. Of those, a methylene group, an ethylene group, and a propylene group are preferred.

Further specific examples of the compound represented by the formula (5) may include the following compounds. A particularly preferred example thereof may be a compound represented by the formula (A) to be described later.

TABLE 1

| | Compound represented by formula (5) | | | | | | |
|---|---|---|---|---|---|---|---|
| No. | $R^{51}$ | $R^{52}$ | $Y^{A1}$ | $Y^{B}$ | $Z^{A}$ | $Z^{A1}$ | m |
| (2-1) | $—CH_3$ | $—CH_3$ | $—CH_2—$ | 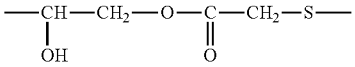 | Formula (2A) | $—CH_3$ | 60 |
| (2-2) | $—CH_3$ | $—CH_3$ | $—CH_2—$ | 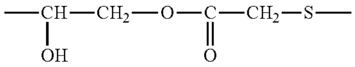 | Formula (2A) | $—CH_3$ | 25 |
| (2-3) | $—CH_3$ | $—CH_3$ | $—CH_2—$ | 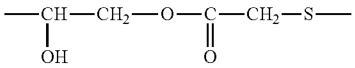 | Formula (2A) | $—CH_3$ | 150 |
| (2-4) | $—CH_3$ | —H | $—CH_2—$ | 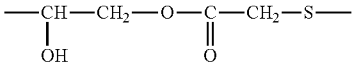 | Formula (2A) | $—CH_3$ | 60 |
| (2-5) | —H | $—CH_3$ | $—CH_2—$ | 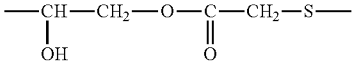 | Formula (2A) | $—CH_3$ | 60 |
| (2-6) | —H | —H | $—CH_2—$ | 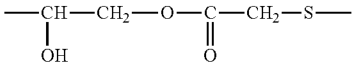 | Formula (2A) | $—CH_3$ | 60 |
| (2-7) | $—CH_3$ | $—CH_3$ | $—CH_2—CH_2—$ | 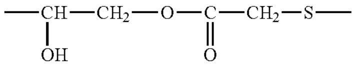 | Formula (2A) | $—CH_3$ | 60 |
| (2-8) | $—CH_3$ | $—CH_3$ | $—CH_2—$ | 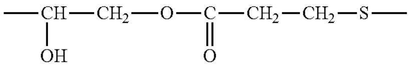 | Formula (2A) | $—CH_3$ | 60 |
| (2-9) | $—CH_3$ | $—CH_3$ | $—CH_2—CH_2—$ | 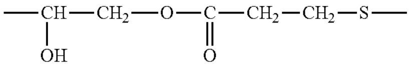 | Formula (2A) | $—CH_3$ | 60 |
| (2-10) | $—CH_3$ | $—CH_3$ | $—CH_2—$ | 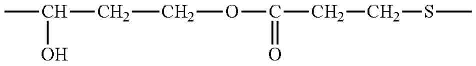 | Formula (2A) | $—CH_3$ | 60 |
| (2-11) | $—CH_3$ | $—CH_3$ | $—CH_2—CH_2—$ | 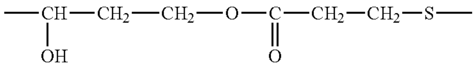 | Formula (2A) | $—CH_3$ | 60 |
| (2-12) | $—CH_3$ | $—CH_3$ | $—CH_2—$ | 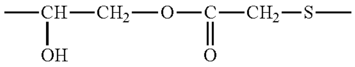 | Formula (2A) | $—CH_2CH_3$ | 60 |
| (2-13) | $—CH_3$ | $—CH_3$ | $—CH_2—$ | 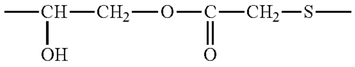 | Formula (2A) | $—CH_2CH_2CH_2CH_3$ | 60 |
| (2-14) | $—CH_3$ | —H | $—CH_2—$ | 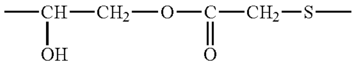 | Formula (2A) | $—CH_2CH_2CH_2CH_3$ | 60 |
| (2-15) | $—CH_3$ | $—CH_3$ | $—CH_2—$ | 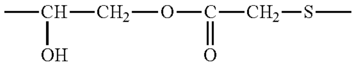 | Formula (2A) | $—CH_2CH(CH_3)_2$ | 60 |
| (2-16) | $—CH_3$ | —H | $—CH_2—$ | 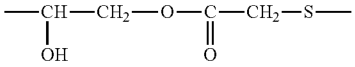 | Formula (2A) | $—CH_2CH(CH_3)_2$ | 60 |
| (2-17) | $—CH_3$ | $—CH_3$ | $—CH_2—$ | 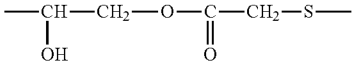 | Formula (2A) | $—C(CH_3)_3$ | 60 |
| (2-18) | $—CH_3$ | —H | $—CH_2—$ | 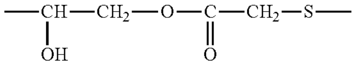 | Formula (2A) | $—C(CH_3)_3$ | 60 |

TABLE 1-continued

| | Compound represented by formula (5) | | | | | | |
|---|---|---|---|---|---|---|---|
| No. | $R^{51}$ | $R^{52}$ | $Y^{A1}$ | $Y^{B}$ | $Z^{A}$ | $Z^{A1}$ | m |
| (2-19) | $—CH_3$ | —H | $—CH_2—$ | 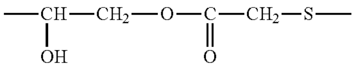 | Phenyl group | — | 60 |
| (2-20) | $—CH_3$ | —H | $—CH_2—$ | 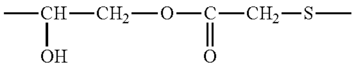 | Cyano group | — | 60 |
| (2-21) | $—CH_3$ | $—CH_3$ | $—CH_2—CH_2—$ | 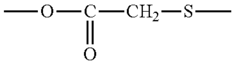 | Formula (2A) | $—CH_3$ | 60 |
| (2-22) | $—CH_3$ | $—CH_3$ | $—CH_2—CH_2—$ | 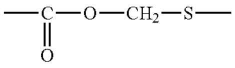 | Formula (2A) | $—CH_3$ | 60 |
| (2-23) | —H | $—CH_3$ | $—CH_2—CH_2—$ | 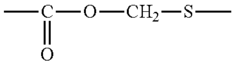 | Formula (2A) | $—CH_3$ | 60 |
| (2-24) | $—CH_3$ | $—CH_3$ | $—CH_2—$ | 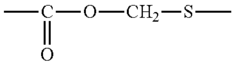 | Formula (2A) | $—CH_3$ | 60 |
| (2-25) | $—CH_3$ | $—CH_3$ | $—CH_2—CH_2—CH_2—CH_2—$ | 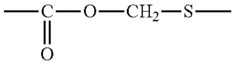 | Formula (2A) | $—CH_3$ | 60 |
| (2-26) | $—CH_3$ | $—CH_3$ | $—CH_2—CH_2—$ | 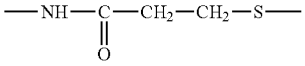 | Formula (2A) | $—CH_3$ | 60 |
| (2-27) | —H | $—CH_3$ | $—CH_2—CH_2—$ | 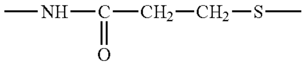 | Formula (2A) | $—CH_3$ | 60 |
| (2-28) | $—CH_3$ | $—CH_3$ | $—CH_2—CH_2—$ | 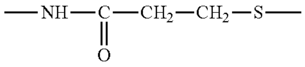 | Formula (2A) | $—CH_3$ | 60 |
| (2-29) | $—CH_3$ | $—CH_3$ | $—CH_2—CH_2—$ | 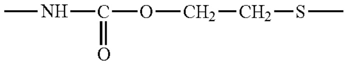 | Formula (2A) | $—CH_3$ | 60 |
| (2-30) | —H | $—CH_3$ | $—CH_2—CH_2—$ | 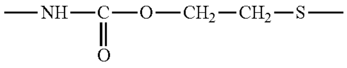 | Formula (2A) | $—CH_3$ | 60 |
| (2-31) | $—CH_3$ | $—CH_3$ | $—CH_2—CH_2—$ | 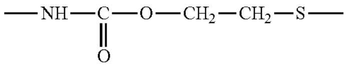 | Formula (2A) | $—CH_3$ | 60 |
| (2-32) | $—CH_3$ | —H | $—CH_2—CH_2—$ | 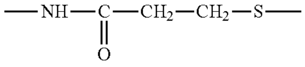 | Formula (2A) | $—CH_3$ | 60 |
| (2-33) | —H | —H | $—CH_2—CH_2—$ | 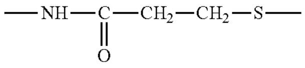 | Formula (2A) | $—CH_3$ | 60 |
| (2-34) | $—CH_3$ | —H | $—CH_2—CH_2—$ | 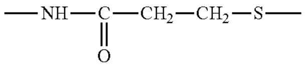 | Formula (2A) | $—CH_3$ | 60 |
| (2-35) | $—CH_3$ | —H | $—CH_2—CH_2—$ | 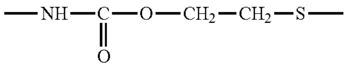 | Formula (2A) | $—CH_3$ | 60 |
| (2-36) | —H | —H | $—CH_2—CH_2—$ | 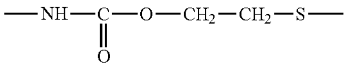 | Formula (2A) | $—CH_3$ | 60 |
| (2-37) | $—CH_3$ | —H | $—CH_2—CH_2—$ | 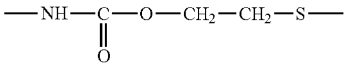 | Formula (2A) | $—CH_3$ | 60 |

<Compound represented by Formula (3)>

The surface layer of the electrophotographic photosensitive member of the present disclosure contains the polymer A of the composition containing the compound represented by the following formula (3).

(3)

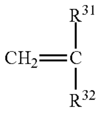

In the formula (3), $R^{31}$ represents a hydrogen atom or a methyl group. $R^{32}$ represents a phenyl group, a substituent represented by the formula (4), or a cyano group.

(4)

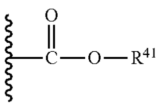

In the formula (4), $R^{41}$ represents an alkyl group having 1 to 4 carbon atoms.

Further, $R^{41}$ more preferably represents a methyl group from the viewpoint of suppressing the occurrence of a ghost image.

Further specific examples of the compound represented by the formula (3) may include the following compounds. A particularly preferred example thereof may be a compound represented by the formula (3-6).

(3-1)

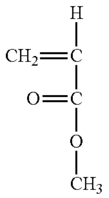

(3-6)

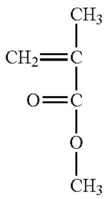

(3-2)

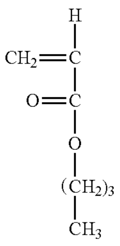

-continued (3-7)

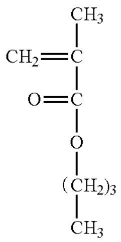

(3-3)

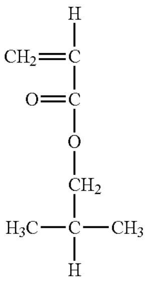

(3-8)

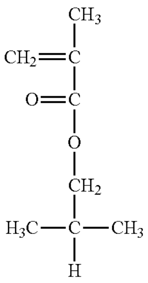

(3-4)

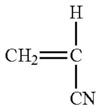

(3-9)

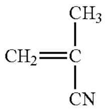

(3-5)

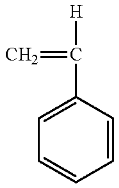

(3-10)

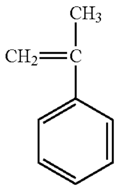

In the composition, the ratio of the compound represented by the formula (3) to the compound represented by the formula (1) is preferably from 0.05 mol % to 2.0 mol %, more preferably from 0.10 mol % to 1.0 mol %, still more preferably from 0.10 mol % to 0.50 mol %.

The polymer A may be a random copolymer, an alternating copolymer, or a block copolymer.

The polymer A may have structural units represented by the following formulae (101), (201), and (301).

(101)

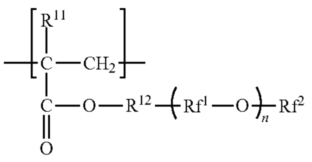

In the formula (101), $R^{11}$ represents a hydrogen atom or a methyl group, $R^{12}$ represents a single bond, a methylene group, or an ethylene group, $Rf^1$s each independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, and "n" represents an integer of from 1 to 3, and when "n" represents 2 or 3, "n" $Rf^1$s may be identical to or different from each other.

(201)

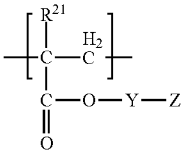

In the formula (201), $R^{21}$ represents a hydrogen atom or a methyl group, Y represents a divalent organic group, and Z represents a polymer moiety.

(301)

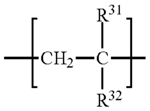

In the formula (301), $R^{31}$ represents a hydrogen atom or a methyl group, and $R^{32}$ represents a phenyl group, a cyano group, or a group represented by the following formula (4).

(4)

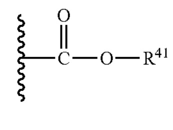

In the formula (4), $R^{41}$ represents an alkyl group having 1 to 4 carbon atoms.

An example of the polymer A is a compound represented by the following formula (c).

(c)

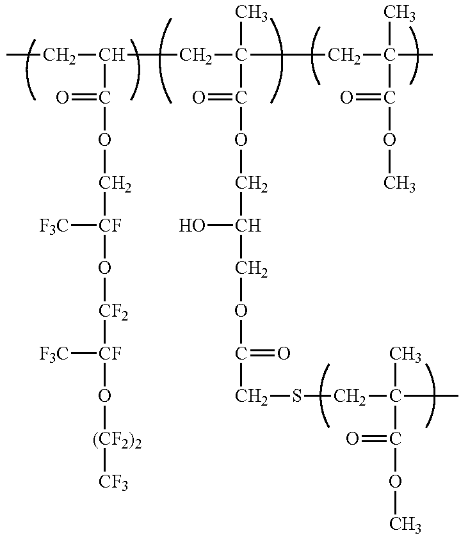

The polymer A is more preferably a polymer obtained by polymerizing only the compound represented by the formula (1), the compound represented by the formula (2), and the compound represented by the formula (3).

In the polymer A to be incorporated into the surface layer of the electrophotographic photosensitive member of the present disclosure, the content of the structural unit derived from the compound represented by the formula (1) is preferably from 5 mol % to 95 mol %, more preferably from 50 mol % to 95 mol %, still more preferably from 70 mol % to 90 mol % with respect to the total content of all the structural units of the polymer A from the viewpoint of improving the dispersibility of the fluorine atom-containing resin particles.

The structural unit derived from the compound represented by the formula (1) accounts for preferably from 0.1 mass % to 80 mass %, more preferably from 1 mass % to 80 mass %, still more preferably from 4 mass % to 66 mass % of the polymer A to be incorporated into the surface layer of the electrophotographic photosensitive member of the present disclosure.

In the polymer A, a molar ratio between the structural unit derived from the compound represented by the formula (1) and the structural unit derived from the compound represented by the formula (2) is preferably from 1:19 to 19:1, more preferably from 1:1 to 19:1, still more preferably from 7:3 to 9:1.

The weight-average molecular weight of the polymer A to be incorporated into the surface layer of the electrophotographic photosensitive member of the present disclosure is preferably from 16,000 to 100,000 from the viewpoints of an improvement in dispersibility of the fluorine atom-containing resin particles and the suppression of the occurrence of a ghost image. Further, the weight-average molecular weight of the polymer A of the composition containing the compounds represented by the formulae (1), (2), and (3) is more preferably from 18,000 to 80,000.

The weight-average molecular weight of the polymer A may be measured and calculated by the following method.

(Measurement of Weight-Average Molecular Weight by GPC)

The weight-average molecular weight according to the present disclosure may be measured by gel permeation chromatography (GPC) as described below.

First, a sample is dissolved in tetrahydrofuran (THF) at room temperature over 24 hours. Then, the resultant solution is filtered with a solvent-resistant membrane filter "Myshoridisk" (manufactured by Tosoh Corporation) having a pore diameter of 0.2 μm to provide a sample solution. The concentration of a THF-soluble component in the sample solution is adjusted to about 0.8 mass %. Measurement is performed with the sample solution under the following conditions.

Apparatus: HLC 8120 GPC (detector: RI) (manufactured by Tosoh Corporation) Column: Septuplicate of Shodex KF-801, 802, 803, 804, 805, 806, and 807 (manufactured by Showa Denko K.K.)

Eluent: Tetrahydrofuran (THF)

Flow rate: 1.0 ml/min

Oven temperature: 40.0° C.

Sample injection amount: 0.10 ml

At the time of the calculation of the molecular weight of the sample, a molecular weight calibration curve prepared with standard polystyrene resins (e.g., product names "TSK Standard Polystyrenes F-850, F-450, F-288, F-128, F-80, F-40, F-20, F-10, F-4, F-2, F-1, A-5000, A-2500, A-1000, and A-500" manufactured by Tosoh Corporation) is used.

The content of the polymer A of the composition containing the compounds represented by the formulae (1), (2), and (3) with respect to the fluorine atom-containing resin particles in the surface layer is preferably from 2 mass % to 10 mass %, more preferably from 4 mass % to 8 mass % from the viewpoints of an improvement in dispersibility of the particles and the suppression of the occurrence of a ghost image.

<Electrophotographic Photosensitive Member>

An example of the layer configuration of the electrophotographic photosensitive member of the present disclosure is illustrated in FIG. 1. In FIG. 1, an undercoat layer 102, a charge-generating layer 103, a charge-transporting layer 104, and a surface layer 105 are laminated on a support 101. A photosensitive layer may include a laminate type photosensitive layer including the charge-generating layer and the charge-transporting layer, or may include a monolayer type photosensitive layer containing a charge-generating substance and a charge-transporting substance.

The surface layer of the electrophotographic photosensitive member of the present disclosure contains: the fluorine atom-containing resin particles; and the polymer A of the composition containing the compound represented by the formula (1), the compound represented by the formula (2), and the compound represented by the formula (3).

As a method of producing the electrophotographic photosensitive member of the present disclosure, there is given a method involving preparing coating liquids for respective layers to be described later, sequentially applying coating liquids for desired layers, and drying the coating liquids. In this case, as a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The configuration of the electrophotographic photosensitive member of the present disclosure is described below.

<Support>

The electrophotographic photosensitive member of the present disclosure preferably includes a support. The support of the electrophotographic photosensitive member is preferably a support having electroconductivity (electroconductive support). In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity is preferably imparted to the resin or the glass through treatment involving, for example, mixing or coating the resin or the glass with an electroconductive material.

<Electroconductive Layer>

An electroconductive layer may be arranged on the support. The arrangement of the electroconductive layer can conceal flaws and unevenness in the surface of the support, and control the reflection of light on the surface of the support.

The electroconductive layer preferably contains electroconductive particles and a resin.

A material for the electroconductive particles is, for example, a metal oxide, a metal, or carbon black.

Examples of the metal oxide include zinc oxide, aluminum oxide, indium oxide, silicon oxide, zirconium oxide, tin oxide, titanium oxide, strontium titanate, magnesium oxide, antimony oxide, and bismuth oxide. Examples of the metal include aluminum, nickel, iron, nichrome, copper, zinc, and silver.

Of those, metal oxide particles are preferably used as the electroconductive particles, and in particular, titanium oxide particles, tin oxide particles, and zinc oxide particles are more preferably used.

When the metal oxide particles are used as the electroconductive particles, the surface of each of the metal oxide particles may be treated with a silane coupling agent or the like, or the metal oxide particles may each be doped with an element, such as phosphorus or aluminum, or an oxide thereof.

In addition, the electroconductive particles may each be of a laminated configuration having a core particle and a coating layer coating the particle. Examples of the core particle include titanium oxide particles, barium sulfate particles, and zinc oxide particles. The coating layer is, for example, metal oxide particles such as tin oxide.

In addition, when the metal oxide particles are used as the electroconductive particles, their volume-average particle diameter is preferably from 1 nm to 500 nm, more preferably from 3 nm to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, resin particles, or titanium oxide.

The electroconductive layer may be formed by preparing a coating liquid for an electroconductive layer containing the above-mentioned materials and a solvent, forming a coating film thereof on the support, and drying the coating film. Examples of the solvent to be used for the coating liquid for an electroconductive layer include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particles in the coating liquid for an electroconductive layer is, for example, a method involving using a paint shaker, a sand mill, a ball mill, or a liquid collision type high-speed disperser.

The average thickness of the electroconductive layer is preferably from 1 μm to 50 μm, particularly preferably from 3 μm to 40 μm.

<Undercoat Layer>

In the present disclosure, the undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron-transporting substance, metal oxide particles, metal particles, an electroconductive polymer, and the like for the purpose of improving electric characteristics. Of those, an electron-transporting substance and metal oxide particles are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron-transporting substance having a polymerizable functional group may be used as the electron-transporting substance and copolymerized with the above-mentioned monomer having a polymerizable functional group to form the undercoat layer as a cured film.

Examples of the metal oxide particles include particles of indium tin oxide, tin oxide, indium oxide, titanium oxide, strontium titanate, zinc oxide, and aluminum oxide. Particles of silicon dioxide may also be used. Examples of the metal particles include particles of gold, silver, and aluminum.

The metal oxide particles to be incorporated into the undercoat layer may be subjected to surface treatment with a surface treatment agent such as a silane coupling agent before use.

A general method is used as a method of subjecting the metal oxide particles to the surface treatment. Examples thereof include a dry method and a wet method.

The dry method involves, while stirring the metal oxide particles in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particles and the surface treatment agent in a solvent, or dispersing the metal oxide particles and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain a known material, such as: metal particles such as aluminum particles; electroconductive substance particles such as carbon black; a charge-transporting substance; a metal chelate compound; or an organometallic compound.

The undercoat layer may be formed by preparing a coating liquid for an undercoat layer containing the above-mentioned materials and a solvent, forming a coating film thereof on the support or the electroconductive layer, and drying and/or curing the coating film.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present disclosure, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision type high-speed disperser.

The average thickness of the undercoat layer is preferably from 0.1 μm to 50 μm, more preferably from 0.2 μm to 40 μm, particularly preferably 0.3 μm to 30 μm.

<Photosensitive Layer>

The photosensitive layers of the electrophotographic photosensitive member are mainly classified into (1) a laminate type photosensitive layer and (2) a monolayer type photosensitive layer. (1) The laminate type photosensitive layer is a photosensitive layer having a charge-generating layer containing a charge-generating substance and a charge-transporting layer containing a charge-transporting substance. (2) The monolayer type photosensitive layer is a photosensitive layer containing both a charge-generating substance and a charge-transporting substance.

(1) Laminate Type Photosensitive Layer

The laminate type photosensitive layer has the charge-generating layer and the charge-transporting layer.

(1-1) Charge-Generating Layer

The charge-generating layer preferably contains the charge-generating substance and a resin.

Examples of the charge-generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge-generating substance in the charge-generating layer is preferably from 40 mass % to 85 mass %, more preferably from 60 mass % to 80 mass % with respect to the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge-generating layer may further contain an additive, such as an antioxidant or a UV absorber. Specific examples thereof include a hindered phenol compound, a hindered amine compound, a sulfur compound, a phosphorus compound, and a benzophenone compound.

The charge-generating layer may be formed by preparing a coating liquid for a charge-generating layer containing the above-mentioned materials and a solvent, forming a coating film thereof on a layer below the charge-generating layer, for example, the undercoat layer, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The average thickness of the charge-generating layer is preferably from 0.1 μm to 1 μm, more preferably from 0.15 μm to 0.4 μm.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge-transporting substance in the charge-transporting layer is preferably from 25 mass % to 70 mass %, more preferably from 30 mass % to 55 mass % with respect to the total mass of the charge-transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge-transporting substance and the resin is preferably from 4:10 to 20:10, more preferably from 5:10 to 12:10.

In addition, when the photosensitive layer is a laminate type photosensitive layer, and a protective layer to be described later is not arranged, the charge-transporting layer serves as the surface layer. In this case, the charge-transporting layer contains: the fluorine atom-containing resin particles; the binder material: and the polymer A of the composition containing the compound represented by the formula (1), the compound represented by the formula (2), and the compound represented by the formula (3).

In addition, the charge-transporting layer may contain an additive, such as an antioxidant, a UV absorber, a plasticizer, or a leveling agent. Specific examples thereof include a hindered phenol compound, a hindered amine compound, a sulfur compound, a phosphorus compound, a benzophenone compound, a siloxane-modified resin, a silicone oil, polystyrene resin particles, polyethylene resin particles, and boron nitride particles.

The charge-transporting layer may be formed by preparing a coating liquid for a charge-transporting layer containing the above-mentioned materials and a solvent, forming a coating film thereof on the charge-generating layer, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The average thickness of the charge-transporting layer is preferably from 5 μm to 50 μm, more preferably from 8 μm to 40 μm, particularly preferably from 10 μm to 30 μm.

(2) Monolayer Type Photosensitive Layer

The monolayer type photosensitive layer may be formed by preparing a coating liquid for a photosensitive layer containing the charge-generating substance, the charge-transporting substance, a resin, and a solvent, forming a coating film thereof on a layer below the photosensitive layer, for example, the undercoat layer, and drying the coating film. Examples of the charge-generating substance, the charge-transporting substance, and the resin are the same as those of the materials in the section "(1) Laminate Type Photosensitive Layer." When the photosensitive layer is a monolayer type photosensitive layer, and a protective layer to be described later is not arranged, the photosensitive layer serves as the surface layer.

<Protective Layer>

In the present invention, a protective layer may be arranged on the photosensitive layer. The arrangement of the protective layer can improve durability.

The protective layer may be formed as a cured film by polymerizing a composition containing a monomer having a polymerizable functional group. A reaction at that time is, for example, a thermal polymerization reaction, a photopolymerization reaction, or a radiation polymerization reaction. Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a group containing a carbon-carbon double bond. Examples of the group containing a carbon-carbon double bond include an acryloyl group and a methacryloyl group. A monomer having a charge-transporting ability may be used as the monomer having a polymerizable functional group.

The monomer having a charge-transporting ability is preferably a monomer that is a compound represented by the following formula (CT-1) or (CT-2).

(CT-1)

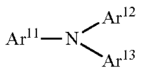

In the formula (CT-1), $Ar^{11}$ to $Ar^{13}$ each independently represent a substituted aryl group or an unsubstituted aryl group, and a substituent that the substituted aryl group may have is an alkyl group having 1 to 6 carbon atoms, or a monovalent functional group represented by any one of the following formulae (P-1) to (P-3), provided that the compound represented by the formula (CT-1) has at least one monovalent functional group represented by any one of the following formulae (P-1) to (P-3).

(CT-2)

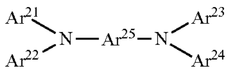

In the formula (CT-2), $Ar^{21}$ to $Ar^{24}$ each independently represent a substituted aryl group or an unsubstituted aryl group, $Ar^{25}$ represents a substituted arylene group or an unsubstituted arylene group, a substituent that the substituted aryl group may have is an alkyl group having 1 to 6 carbon atoms, or a monovalent functional group represented by any one of the following formulae (P-1) to (P-3), and a substituent that the substituted arylene group may have is an alkyl group having 1 to 6 carbon atoms, or a monovalent functional group represented by any one of the following formulae (P-1) to (P-3), provided that the compound represented by the formula (CT-2) has at least one monovalent functional group represented by any one of the following formulae (P-1) to (P-3).

(P-1)

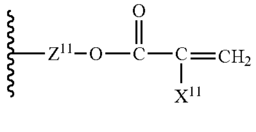

In the formula (P-1), $Z^{11}$ represents a single bond or an alkylene group having 1 to 6 carbon atoms, and $X^{11}$ represents a hydrogen atom or a methyl group.

(P-2)

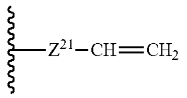

In the formula (P-2), $Z^{21}$ represents a single bond or an alkylene group having 1 to 6 carbon atoms.

(P-3)

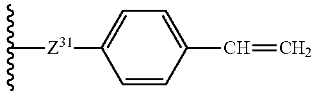

In the formula (P-3), $Z^{31}$ represents a single bond or an alkylene group having 1 to 6 carbon atoms.

In the case where the protective layer is arranged, the protective layer serves as the surface layer of the electrophotographic photosensitive member. In this case, the protective layer contains the fluorine atom-containing resin particles, the binder material, and the polymer A.

The protective layer may contain an additive, such as an antioxidant, a UV absorber, a plasticizer, or a leveling agent. Specific examples thereof include a hindered phenol compound, a hindered amine compound, a sulfur compound, a phosphorus compound, a benzophenone compound, a siloxane-modified resin, and a silicone oil.

The protective layer may be formed by preparing a coating liquid for a protective layer containing the above-mentioned materials and a solvent, forming a coating film thereof on the photosensitive layer, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent. Of those, an alcohol-based solvent is preferred from the viewpoint that the solvent does not dissolve the photosensitive layer below the protective layer.

The average thickness of the protective layer is preferably from 0.5 μm to 10 μm, more preferably from 1 μm to 7 μm.

<Surface Processing of Electrophotographic Photosensitive Member>

In the present disclosure, the surface processing of the electrophotographic photosensitive member may be performed. The performance of the surface processing can further stabilize the behavior of a cleaning unit (cleaning blade) to be brought into contact with the electrophotographic photosensitive member. A method for the surface processing is, for example, a method including bringing a mold having a convex portion into pressure contact with the surface of the electrophotographic photosensitive member to perform shape transfer, a method including imparting an uneven shape to the surface through mechanical polishing, or a method including causing powder to collide with the surface of the electrophotographic photosensitive member to roughen the surface. When a concave portion or a convex portion is arranged on the surface layer of the electrophotographic photosensitive member as described above, the behavior of the cleaning unit to be brought into contact with the electrophotographic photosensitive member can be further stabilized.

The above-mentioned concave portion or convex portion may be formed in the entire region of the surface of the electrophotographic photosensitive member, or may be formed on part of the surface of the electrophotographic photosensitive member. When the concave portion or the convex portion is formed on part of the surface of the electrophotographic photosensitive member, the concave portion or the convex portion is preferably formed in at least the entirety of the region of the photosensitive member to be brought into contact with the cleaning unit (cleaning blade).

When the concave portion is formed, the concave portion may be formed in the surface of the electrophotographic photosensitive member by bringing a mold having a convex portion corresponding to the concave portion into pressure contact with the surface of the electrophotographic photosensitive member to perform shape transfer.

<Polishing Tool to be Used in Mechanical Polishing>

A known unit may be utilized in the mechanical polishing. In general, a polishing tool is brought into abutment with the electrophotographic photosensitive member, and one, or each of both, of the polishing tool and the electrophotographic photosensitive member is relatively moved to polish the surface of the electrophotographic photosensitive member. The polishing tool is a polishing member obtained by arranging, on a substrate, a layer obtained by dispersing polishing abrasive grains in a binder resin.

Examples of the abrasive grains include particles of aluminum oxide, chromium oxide, diamond, iron oxide, cerium oxide, corundum, silica, silicon nitride, boron nitride, molybdenum carbide, silicon carbide, tungsten carbide, titanium carbide, and silicon oxide. The particle diameter of each of the abrasive grains is preferably from 0.01 μm to 50 μm, and is more preferably from 1 μm to 15 μm. When the particle diameter of each of the abrasive grains is excessively small, their polishing power weakens to make it difficult to increase the F/C ratio of the outermost surface of the electrophotographic photosensitive member. Those abrasive grains may be used alone or as a mixture thereof. When two or more kinds of the abrasive grains are mixed, their materials or particle diameters may be different from or identical to each other.

A thermoplastic resin, a thermosetting resin, a reactive resin, an electron beam-curable resin, a UV-curable resin, a visible light-curable resin, and an antifungal resin that are known may each be used as the binder resin in which the abrasive grains to be used in the polishing tool are dispersed. Examples of the thermoplastic resin include a vinyl chloride resin, a polyamide resin, a polyester resin, a polycarbonate resin, an amino resin, a styrene-butadiene copolymer, a urethane elastomer, and a polyamide-silicone resin. Examples of the thermosetting resin include a phenol resin, a phenoxy resin, an epoxy resin, a polyurethane resin, a polyester resin, a silicone resin, a melamine resin, and an alkyd resin. In addition, an isocyanate-based curing agent may be added to the thermoplastic resin.

The thickness of the layer of the polishing tool, which is obtained by dispersing the abrasive grains in the binder resin, is preferably from 1 μm to 100 μm. When the thickness is excessively large, thickness unevenness is liable to occur, and as a result, the unevenness of the surface roughness of a polishing target becomes a problem. Meanwhile, when the thickness is excessively small, the falling of the abrasive grains is liable to occur.

The shape of the substrate of the polishing tool is not particularly limited. Although a sheet-shaped substrate was used in each of Examples of the present disclosure for efficiently polishing a cylindrical electrophotographic photosensitive member, any other shape is permitted (the polishing tool of the present disclosure is hereinafter also described as "polishing sheet"). A material for the substrate of the polishing tool is also not particularly limited. A material for the sheet-shaped substrate is, for example, paper, a woven fabric, a nonwoven fabric, or a plastic film.

The polishing tool may be obtained by: mixing the abrasive grains and the binder resin described above, and a solvent capable of dissolving the binder resin to disperse the materials in the solvent; applying the resultant paint onto the substrate; and drying the paint.

<Polishing Apparatus>

Figure 2:
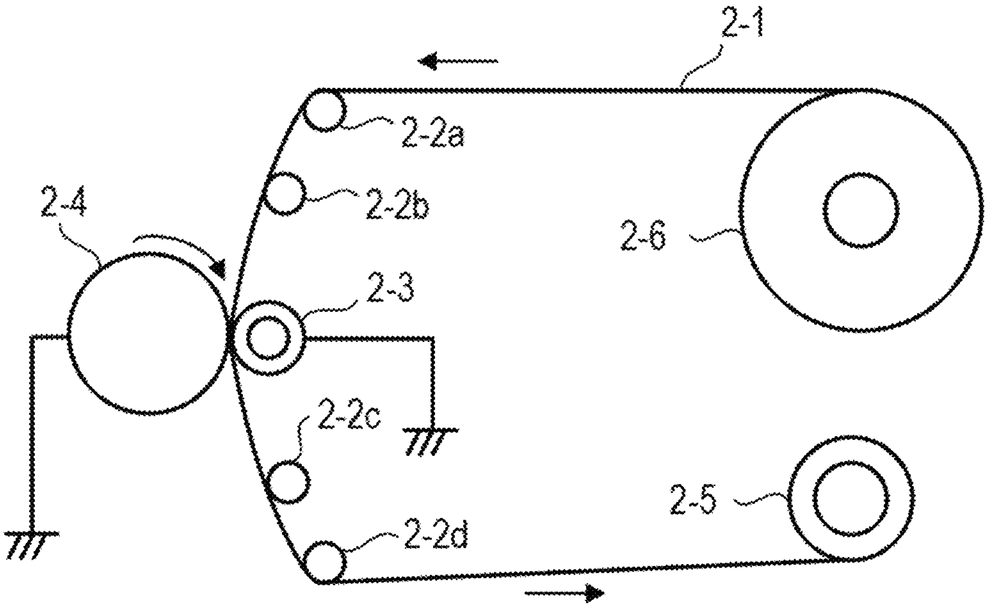
FIG. 2 is a view for illustrating an example of a polishing machine using a polishing sheet.

An example of a polishing apparatus for the electrophotographic photosensitive member of the present disclosure is illustrated in FIG. 2.

FIG. 2 is an illustration of an apparatus for polishing a cylindrical electrophotographic photosensitive member with a polishing sheet. In FIG. 2, a polishing sheet 2-1 is wound around a hollow shaft 2-6, and a motor (not shown) is arranged so that a tension may be applied to the polishing sheet 2-1 in a direction opposite to the direction in which the polishing sheet 2-1 is fed to the shaft 2-6. The polishing sheet 2-1 is fed in a direction indicated by the arrow, and passes through a backup roller 2-3 via guide rollers 2-2*a* and 2-2*b*. The polishing sheet 2-1 after the polishing is taken up around a take-up unit 2-5 by the motor (not shown) via guide rollers 2-2*c* and 2-2*d*. The polishing is performed by bringing the polishing sheet 2-1 into pressure contact with a treatment target (electrophotographic photosensitive member before the performance of the polishing) 2-4 all the time. The polishing sheet 2-1 is often insulating, and hence a product connected to the ground or a product having electroconductivity is preferably used in a site with which the polishing sheet 2-1 is brought into contact.

The feeding speed of the polishing sheet 2-1 is preferably from 10 mm/min to 1,000 mm/min. When the feeding amount thereof is small, the binder resin adheres to the surface of the polishing sheet 2-1, and a deep flaw resulting from the adhesion occurs in the surface of the treatment target 2-4 in some cases.

The treatment target 2-4 is placed at a position facing the backup roller 2-3 through the polishing sheet 2-1. The backup roller 2-3 is preferably an elastic body from the viewpoint of improving the uniformity of the surface roughness of the treatment target 2-4. At this time, the treatment target 2-4 and the backup roller 2-3 are pressed against each other through the polishing sheet 2-1 at a pressure of a desired preset value for a predetermined time period. Thus, the surface of the treatment target 2-4 is polished. The rotation direction of the treatment target 2-4 may be identical to the direction in which the polishing sheet 2-1 is fed, or may be opposite thereto. In addition, the rotation direction may be changed in the middle of the polishing.

The pressure at which the backup roller 2-3 is pressed against the treatment target 2-4 is preferably from 0.005 $N/m^2$ to 15 $N/m^2$, though the preferred value varies depending on the hardness of the backup roller 2-3 and a polishing time.

The surface roughness of the electrophotographic photosensitive member may be adjusted by appropriately selecting, for example, the feeding speed of the polishing sheet 2-1, the pressure at which the backup roller 2-3 is pressed against the treatment target, the kinds of the abrasive grains of the polishing sheet, the thickness of the binder resin of the polishing sheet, and the thickness of the substrate.

<Measurement of Maximum Height Rmax in JIS B0601 1982>

The surface roughness of the electrophotographic photosensitive member may be measured with a known unit.

Examples thereof include: a surface roughness meter such as a surface roughness measuring instrument SURFCORDER SE3500 manufactured by Kosaka Laboratory Ltd.; a non-contact three-dimensional surface-measuring machine MICROMAP 557N manufactured by Ryoka Systems Inc.; and a microscope capable of obtaining a three-dimensional shape, such as an ultra-depth shape-measuring microscope VK-8550 or VK-9000 manufactured by Keyence Corporation.

In the present disclosure, out of the indices of a surface roughness, a maximum height Rmax in JIS B0601 1982 specified by Japanese Industrial Standards (JIS) is used as a polishing depth L (μm). In addition, in the present disclosure, the Rmax is measured in advance for a 5-millimeter square section range of the electrophotographic photosensitive member to be cut out as a specimen for X-ray photoelectron spectroscopy to be described later. The measurement is performed at 3 arbitrary sites in the 5-millimeter square range, and the average of the measured values is adopted as the polishing depth L (μm).

<Process Cartridge and Electrophotographic Apparatus>

The electrophotographic photosensitive member of the present disclosure may be one constituent for a process cartridge or an electrophotographic apparatus. The process cartridge integrally supports the electrophotographic photosensitive member described in the foregoing, and at least one unit selected from the group consisting of: a charging unit; a developing unit; a transfer unit; and a cleaning unit, and is detachably attachable to the main body of an electrophotographic apparatus. In addition, the electrophotographic apparatus includes: the electrophotographic photosensitive member described in the foregoing; a charging unit; an exposing unit; a developing unit; and a transfer unit.

Figure 3:
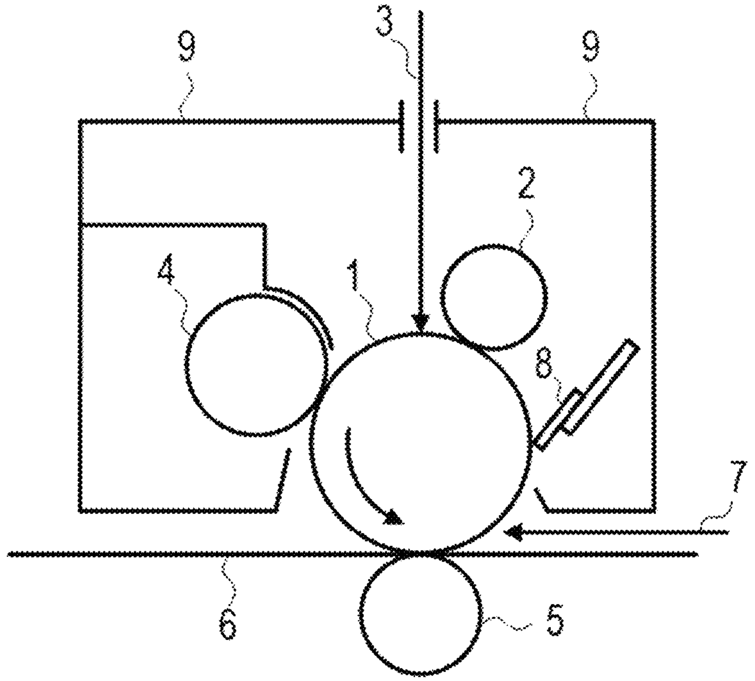
FIG. 3 is a view for illustrating an example of a process cartridge including the electrophotographic photosensitive member of the present disclosure.
Figure 4:
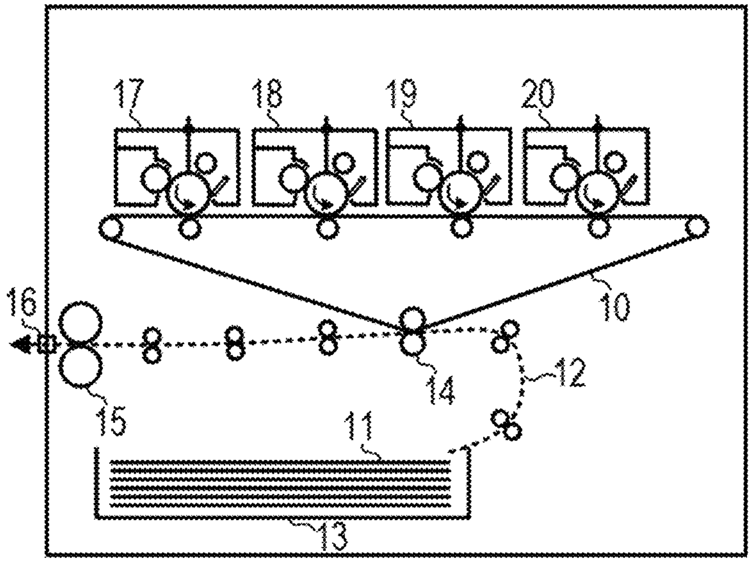
FIG. 4 is a view for illustrating an example of an electrophotographic apparatus including the electrophotographic photosensitive member of the present disclosure.

The configuration of a process cartridge including the electrophotographic photosensitive member of the present disclosure is illustrated in FIG. 3, and an example of the schematic configuration of an electrophotographic apparatus including the process cartridge of FIG. 3 is illustrated in FIG. 4.

In FIG. 3, an electrophotographic photosensitive member 1 of a cylindrical shape is rotationally driven in a direction indicated by the arrow at a predetermined peripheral speed. The peripheral surface of the electrophotographic photosensitive member 1 to be rotationally driven is uniformly charged to a positive or negative predetermined potential by a charging unit 2. Next, the charged peripheral surface of the electrophotographic photosensitive member 1 receives exposure light (image exposure light) 3 emitted from an exposing unit (not shown), such as slit exposure or laser beam scanning exposure. Thus, electrostatic latent images corresponding to a target image are sequentially formed on the peripheral surface of the electrophotographic photosensitive member 1. Any one of a voltage obtained by superimposing an AC component on a DC component and a voltage formed only of a DC component may be used as a voltage to be applied to the charging unit (e.g., a charging roller) 2.

The electrostatic latent images formed on the peripheral surface of the electrophotographic photosensitive member 1 are developed with toner in the developer of a developing unit 4 to turn into toner images. Next, the toner images formed and carried on the peripheral surface of the electrophotographic photosensitive member 1 are sequentially transferred onto a transfer material (e.g., paper or an intermediate transfer member) 6 by a transfer bias from a transfer unit (e.g., a transfer roller) 5. The transfer material 6 is fed in sync with the rotation of the electrophotographic photosensitive member 1.

The surface of the electrophotographic photosensitive member 1 after the transfer of the toner images is subjected to electricity-removing treatment by pre-exposure light 7 from a pre-exposing unit (not shown). After that, transfer residual toner is removed from the surface by a cleaning unit 8, and hence the surface is cleaned. Thus, the electrophotographic photosensitive member 1 is repeatedly used in image formation. The electricity-removing treatment by the pre-exposing unit may be performed before the cleaning process or may be performed thereafter, and the pre-exposing unit is not necessarily required.

The electrophotographic photosensitive member 1 may be mounted on an electrophotographic apparatus, such as a copying machine or a laser beam printer. In addition, a process cartridge 9, which is formed by storing a plurality of constituents out of the constituents, such as the electrophotographic photosensitive member 1, the charging unit 2, the developing unit 4, and the cleaning unit 8, in a container, and integrally supporting the stored constituents, may be detachably attachable to the main body of the electrophotographic apparatus. In FIG. 3, the electrophotographic photosensitive member 1, the charging unit 2, the developing unit 4, and the cleaning unit 8 are integrally supported to form the process cartridge 9 detachably attachable to the main body of the electrophotographic apparatus.

An example of the configuration of the electrophotographic apparatus of the present disclosure is illustrated in FIG. 4. A process cartridge 17 for a yellow color, a process cartridge 18 for a magenta color, a process cartridge 19 for a cyan color, and a process cartridge 20 for a black color corresponding to a yellow color, a magenta color, a cyan color, and a black color, respectively, are juxtaposed along an intermediate transfer member 10. It is not necessarily required to unify the diameters and constituent materials of the electrophotographic photosensitive members, developers, charging systems, and the other units among the respective colors.

Once an image-forming operation starts, the toner images of the respective colors are sequentially superimposed on the intermediate transfer member 10 in accordance with the above-mentioned image-forming process. In parallel with the foregoing, a transfer sheet 11 is fed from a sheet-feeding tray 13 by a sheet-feeding path 12, and is fed to a secondary transfer unit 14 at the same timing as that of the rotation operation of the intermediate transfer member 10. The toner images on the intermediate transfer member 10 are transferred onto the transfer sheet 11 by a transfer bias from the secondary transfer unit 14. The toner images transferred onto the transfer sheet 11 are conveyed along the sheet-feeding path 12, and are fixed onto the transfer sheet 11 by a fixing unit 15, followed by the discharge of the sheet from a sheet-discharging portion 16.

According to one aspect of the present disclosure, there can be provided the electrophotographic photosensitive member, which is excellent in dispersibility of the fluorine atom-containing resin particles in the surface layer, and is suppressed from causing a ghost image at the time of its repeated use.

EXAMPLES

The present disclosure is described in more detail below by way of Examples and Comparative Examples, but is not limited thereto. In the description of Examples below, the term "part(s)" means "part(s) by mass" unless otherwise stated.

<Synthesis of Polymer A>

A polymer of a composition containing the compounds represented by the formulae (1), (2), and (3), or the like (hereinafter also represented as "graft copolymer") in the present disclosure was synthesized as described below. Acrylate compounds and a macromonomer compound used in the following synthesis examples may be produced with reference to, for example, Japanese Patent Application Laid-Open No. 2009-104145.

(Graft Copolymer 1)

100 Parts of 1H,1H-perfluoro(2,5-dimethyl-3,6-dioxanonanoyl) acrylate (manufactured by Sigma-Aldrich Co. LLC), which was a compound represented by the formula (1-1), 139.89 parts of a macromonomer represented by the following formula (A) (number-average molecular weight: 6,000), which was a compound represented by the formula (2), 0.093 part of methyl methacrylate, which was a compound represented by the formula (3), 0.874 part of 1,1'-azobis(1-acetoxy-1-phenylethane) (product name: OTAZO-15, manufactured by Otsuka Chemical Co., Ltd.), and 676 parts of n-butyl acetate were mixed in a glass-made flask including a stirring machine, a reflux condenser, a nitrogen gas-introducing tube, a thermostat, and a temperature gauge at 20° C. under a nitrogen atmosphere for 30 minutes. After that, the mixture was subjected to a reaction for 5 hours while being warmed so that the temperature of a reaction liquid became from 85° C. to 90° C. The reaction was stopped by ice cooling, and 3,000 parts of 2-propanol was added to the reaction liquid to provide a precipitate. The precipitate was washed with a mixed solvent containing n-butyl acetate and 2-propanol at 1:5, and was dried at a temperature of 80° C. under a decompressed state of 1,325 Pa or less for 3 hours to provide a graft copolymer 1.

(A)

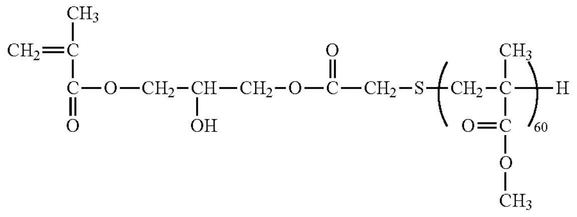

(Graft Copolymers 2 to 39)

Graft copolymers 2 to 39 were each obtained in the same manner as in the graft copolymer 1 except that the compounds represented by the formulae (1) to (3) were changed to compounds shown in Table 2, and their amounts were changed to the numbers of parts by mass shown therein.

In the graft copolymers 37 to 39, compounds represented by the following formula (a-1) and formula (a-2), which did not correspond to the compound represented by the formula (1), were used instead of the compound represented by the formula (1).

(a-1)

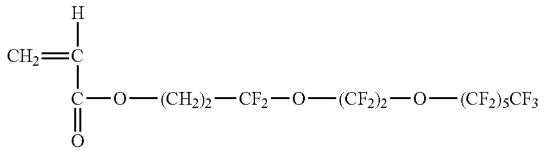

(a-2)

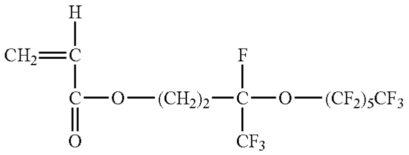

The weight-average molecular weights of the resultant graft copolymers 1 to 39 were calculated by performing GPC measurement in accordance with the above-mentioned method. The results are shown in Table 2.

TABLE 2

| Graft copolymer No. | Compound represented by formula (1) or the like | Compound represented by formula (2) | Compound represented by formula (3) | Number of parts by mass | | | Molar ratio of compound represented by formula (3) to compound represented by formula (1) [%] | Weight-average molecular weight |
|---|---|---|---|---|---|---|---|---|
| | | | | Formula (1) | Formula (2) | Formula (3) | | |
| 1 | (1-1) | (A) | Methyl methacrylate | 100 | 139.89 | 0.093 | 0.50 | 30,000 |
| 2 | (1-1) | (A) | Methyl methacrylate | 100 | 474.82 | 0.056 | 0.30 | 30,000 |
| 3 | (1-1) | (A) | Methyl methacrylate | 100 | 139.89 | 0.056 | 0.30 | 30,000 |
| 4 | (1-1) | (A) | Methyl methacrylate | 100 | 120.62 | 0.056 | 0.30 | 30,000 |
| 5 | (1-1) | (A) | Methyl methacrylate | 100 | 478.02 | 0.019 | 0.10 | 30,000 |
| 6 | (1-1) | (A) | Methyl methacrylate | 100 | 139.89 | 0.019 | 0.10 | 30,000 |
| 7 | (1-2) | (A) | Methyl methacrylate | 100 | 178.52 | 0.071 | 0.30 | 30,000 |
| 8 | (1-1) | (A) | Methyl methacrylate | 100 | 139.89 | 0.056 | 0.30 | 16,000 |
| 9 | (1-2) | (A) | Methyl methacrylate | 100 | 178.52 | 0.071 | 0.30 | 16,000 |
| 10 | (1-1) | (A) | Methyl methacrylate | 100 | 139.89 | 0.056 | 0.30 | 80,000 |
| 11 | (1-2) | (A) | Methyl methacrylate | 100 | 178.52 | 0.071 | 0.30 | 100,000 |
| 12 | (1-1) | (A) | Methyl methacrylate | 100 | 139.89 | 0.149 | 0.80 | 30,000 |
| 13 | (1-2) | (A) | Methyl methacrylate | 100 | 178.52 | 0.191 | 0.80 | 30,000 |
| 14 | (1-3) | (A) | Methyl methacrylate | 100 | 202.64 | 0.216 | 0.80 | 30,000 |
| 15 | (1-4) | (A) | Methyl methacrylate | 100 | 202.64 | 0.216 | 0.80 | 30,000 |
| 16 | (1-5) | (A) | Methyl methacrylate | 100 | 140.40 | 0.150 | 0.80 | 30,000 |
| 17 | (1-1) | (A) | Methyl methacrylate | 100 | 139.89 | 0.187 | 1.00 | 30,000 |
| 18 | (1-1) | (A) | Methyl methacrylate | 100 | 139.89 | 0.015 | 0.08 | 30,000 |
| 19 | (1-1) | (A) | Methyl methacrylate | 100 | 139.89 | 0.373 | 2.00 | 30,000 |
| 20 | (1-1) | (A) | Styrene | 100 | 139.89 | 0.389 | 2.00 | 30,000 |
| 21 | (1-2) | (A) | Styrene | 100 | 178.52 | 0.496 | 2.00 | 30,000 |

TABLE 2-continued

| Graft copolymer No. | Compound represented by formula (1) or the like | Compound represented by formula (2) | Compound represented by formula (3) | Number of parts by mass Formula (1) | Formula (2) | Formula (3) | Molar ratio of compound represented by formula (3) to compound represented by formula (1) [%] | Weight-average molecular weight |
|---|---|---|---|---|---|---|---|---|
| 22 | (1-2) | (A) | Acrylonitrile | 100 | 178.52 | 0.253 | 2.00 | 30,000 |
| 23 | (1-6) | (A) | Styrene | 100 | 159.53 | 0.443 | 2.00 | 30,000 |
| 24 | (1-7) | (A) | Styrene | 100 | 144.19 | 0.400 | 2.00 | 30,000 |
| 25 | (1-8) | (A) | Styrene | 100 | 139.89 | 0.389 | 2.00 | 30,000 |
| 26 | (1-9) | (A) | Styrene | 100 | 148.19 | 0.412 | 2.00 | 30,000 |
| 27 | (1-10) | (A) | Styrene | 100 | 140.40 | 0.390 | 2.00 | 30,000 |
| 28 | (1-11) | (A) | Styrene | 100 | 136.32 | 0.379 | 2.00 | 30,000 |
| 29 | (1-12) | (A) | Styrene | 100 | 124.96 | 0.347 | 2.00 | 30,000 |
| 30 | (1-13) | (A) | Styrene | 100 | 224.46 | 0.623 | 2.00 | 30,000 |
| 31 | (1-14) | (A) | Styrene | 100 | 124.96 | 0.338 | 2.00 | 30,000 |
| 32 | (1-12) | (A) | Styrene | 100 | 124.96 | 0.347 | 2.00 | 15,000 |
| 33 | (1-12) | (A) | Styrene | 100 | 124.96 | 0.347 | 2.00 | 110,000 |
| 34 | (1-12) | (A) | — | 100 | 124.96 | — | 0.00 | 30,000 |
| 35 | (1-12) | — | Styrene | 100 | — | 0.347 | 2.00 | 30,000 |
| 36 | (1-12) | — | Methyl methacrylate | 100 | — | 0.334 | 2.00 | 30,000 |
| 37 | (a-1) | (A) | Methyl methacrylate | 100 | 124.96 | 0.334 | 2.00 | 30,000 |
| 38 | (a-2) | (A) | — | 100 | 140.40 | — | 0.00 | 30,000 |
| 39 | (a-2) | (A) | Methyl methacrylate | 100 | 140.40 | 0.375 | 2.00 | 30,000 |

<Production of Electrophotographic Photosensitive Member>

Example 1-1

(Support 1)

A product obtained by cutting a cylindrical aluminum cylinder (JIS-A3003, aluminum alloy, outer diameter: 30.6 mm, length: 370 mm, wall thickness: 1 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off After that, the cleaned product was further subjected to ultrasonic cleaning in pure water to be subjected to degreasing treatment. The resultant was used as a support 1.

(Undercoat Layer 1)

100 Parts of zinc oxide particles (specific surface area: 19 $m^2/g$, powder resistance: $4.7\times10^6$ Ω·cm) were stirred and mixed with 500 parts of toluene, and 0.8 part of a silane coupling agent (compound name: N-2-(aminoethyl)-3-aminopropylmethyldimethoxysilane, product name: KBM-602, manufactured by Shin-Etsu Chemical Co., Ltd.) was added to the mixture, followed by stirring for 6 hours. After that, toluene was evaporated under reduced pressure, and the residue was heated and dried at 130° C. for 6 hours to provide surface-treated zinc oxide particles A.

Subsequently, 15 parts of a butyral resin (product name: BM-1, manufactured by Sekisui Chemical Company, Limited) serving as a polyol and 15 parts of a blocked isocyanate (product name: DURANATE TPA-B80E, non-volatile content: 80 mass %, manufactured by Asahi Kasei Chemicals Corporation) were dissolved in a mixed solvent containing 73.5 parts of methyl ethyl ketone and 73.5 parts of 1-butanol. 80.8 Parts of the surface-treated zinc oxide particles A and 0.81 part of 2,3,4-trihydroxybenzophenone (manufactured by Tokyo Chemical Industry Co., Ltd.) were added to the solution, and the materials were dispersed with a sand mill apparatus using glass beads each having a diameter of 0.8 mm under an atmosphere at 23° C.±3° C. for 3 hours.

After the dispersion treatment, 0.01 part of a silicone oil (product name: SH28PA, manufactured by Dow Corning Toray Co., Ltd. (formerly Dow Corning Toray Silicone Co., Ltd.)) and 5.6 parts of crosslinked polymethyl methacrylate (PMMA) particles (product name: TECHPOLYMER SSX-103, manufactured by Sekisui Kasei Co., Ltd., average primary particle diameter: 3 μm) were added to the resultant, and the mixture was stirred to prepare a coating liquid for an undercoat layer.

The resultant coating liquid for an undercoat layer was applied onto the above-mentioned support by dip coating to form a coating film, and the coating film was dried for 30 minutes at 160° C. to form an undercoat layer 1 having a thickness of 18

(Charge-Generating Layer 1)

4 Parts of a hydroxygallium phthalocyanine crystal (charge-generating substance) of a crystal form having strong peaks at Bragg angles 2θ±0.2° of 7.4° and 28.1° in CuKα characteristic X-ray diffraction, and 0.04 part of a compound represented by the following formula (E) were added to a liquid obtained by dissolving 2 parts of polyvinyl butyral (product name: S-LEC BX-1, manufactured by Sekisui Chemical Company, Limited) in 100 parts of cyclohexanone. After that, the mixture was subjected to dispersion treatment with a sand mill using glass beads each having a diameter of 1 mm under an atmosphere at 23° C.±3° C. for 1 hour. After the dispersion treatment, 100 parts of ethyl acetate was added to the resultant to prepare a coating liquid for a charge-generating layer.

The coating liquid for a charge-generating layer was applied onto the undercoat layer 1 by dip coating, and the resultant coating film was dried for 10 minutes at 90° C. to form a charge-generating layer 1 having a thickness of 0.15 μm.

(E)

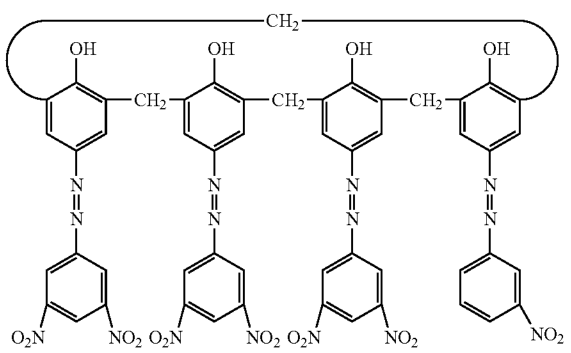

(Charge-Transporting Layer 1)

60 Parts of a compound represented by the following formula (F), 30 parts of a compound represented by the following formula (G), 10 parts of a compound represented by the following formula (H), 100 parts of a bisphenol Z type polycarbonate resin (product name: IUPILON Z400, manufactured by Mitsubishi Engineering-Plastics Corporation), and 0.2 part of polycarbonate having a structural unit represented by the following formula (I) (viscosity-average molecular weight Mv: 20,000) were dissolved in a mixed solvent containing 272 parts of o-xylene, 256 parts of methyl benzoate, and 272 parts of dimethoxymethane to prepare a coating liquid for a charge-transporting layer.

The coating liquid for a charge-transporting layer was applied onto the above-mentioned charge-generating layer 1 by dip coating to form a coating film, and the resultant coating film was dried for 50 minutes at 115° C. to form a charge-transporting layer 1 having a thickness of 18 μm.

(F)

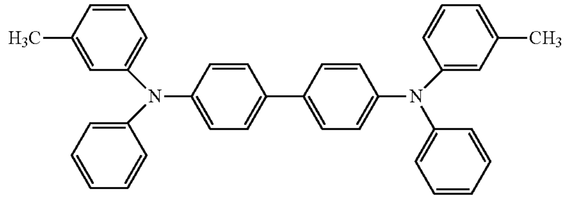

(G)

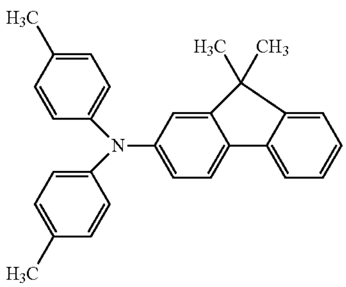

-continued (H)

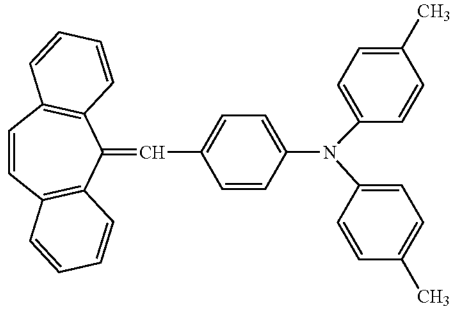

(I)

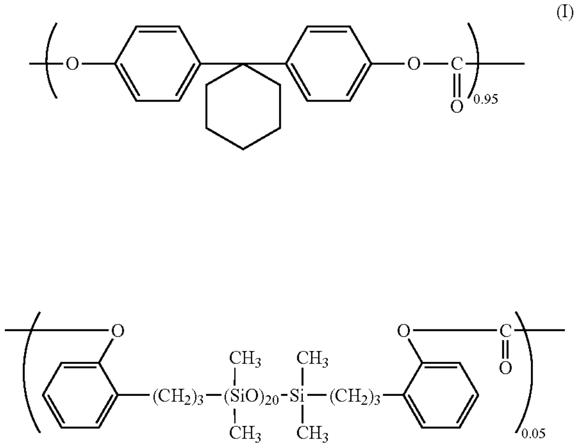

In the formula (I), 0.95 and 0.05 represent the molar ratios (copolymerization ratios) of the two structural units.

(Protective Layer 1)

2.20 Parts of the above-mentioned graft copolymer 1 was dissolved in a mixed solvent formed of 100 parts of 1,1,2,2-tetrafluoroethyl-2,2,2-trifluoroethyl ether (product name: AE-3000, manufactured by AGC Inc.) and 100 parts of 1-propanol to prepare a dispersant solution.

40 Parts of polytetrafluoroethylene resin particles (average primary particle diameter: 210 nm, average circularity: 0.85) were added to the resultant dispersant solution. Then, the mixture was passed through a high-pressure dispersing machine (product name: MICROFLUIDIZER M-110EH, manufactured by Microfluidics, USA) to provide a polytetrafluoroethylene resin particle dispersion liquid.

75.4 Parts of a hole-transportable compound represented by the following formula (B), 21.9 parts of a compound represented by the following formula (C), and 100 parts of 1-propanol were added to the resultant polytetrafluoroethylene resin particle dispersion liquid. After that, the mixture was filtered with a polyflon filter (product name: PF-040, manufactured by Advantec Toyo Kaisha, Ltd.) to prepare a polytetrafluoroethylene resin particle dispersion liquid (coating liquid for a protective layer).

(B)

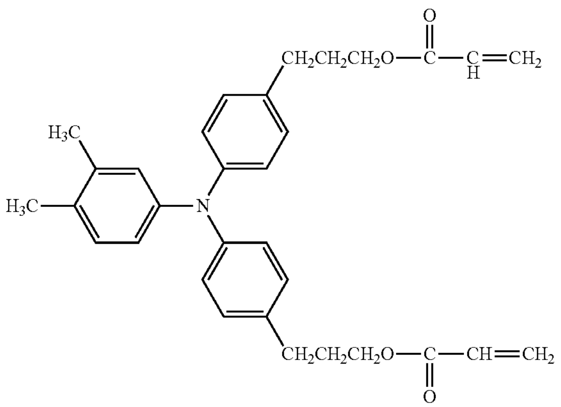

(C)

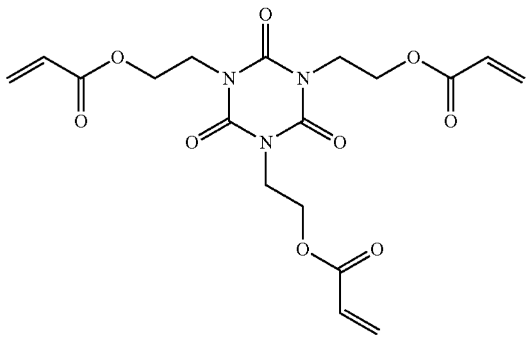

The prepared coating liquid for a protective layer was applied onto the charge-transporting layer 1 by dip coating to form a coating film, and the resultant coating film was dried for 5 minutes at 40° C. After the drying, under a nitrogen atmosphere, the coating film was irradiated with electron beams for 1.6 seconds under the conditions of an acceleration voltage of 70 kV and an absorbed dose of 15 kGy. After that, under the nitrogen atmosphere, the coating film was subjected to heating treatment for 15 seconds under such a condition that its temperature became 135° C. An oxygen concentration during a time period from the electron beam irradiation to the 15 seconds of heating treatment was 15 ppm. Next, in the air, the coating film was naturally cooled until its temperature became 25° C. After that, the coating film was subjected to heating treatment for 1 hour under such a condition that its temperature became 105° C. Thus, a surface layer (protective layer 1) having a thickness of 5 μm was formed.

Thus, an electrophotographic photosensitive member including the support and the surface layer before its surface polishing was produced.

<Surface Processing of Electrophotographic Photosensitive Member>

(Polishing of Electrophotographic Photosensitive Member Before Surface Polishing)

The surface of the electrophotographic photosensitive member before the formation of a surface shape was polished. The polishing was performed with the above-mentioned polishing apparatus under the following conditions.

| | |
|---|---|
| Feeding speed of polishing sheet; | 400 mm/min |
| Number of revolutions of electrophotographic photosensitive member; | 450 rpm |
| Indentation of electrophotographic photosensitive member into backup roller; | 3.5 mm |
| Feeding direction of polishing sheet and rotation direction of electrophotographic photosensitive member; | identical with each other |
| Backup roller; | outer diameter: 100 mm, Asker C hardness: 25 |

A polishing sheet A to be mounted on the polishing apparatus was produced by mixing polishing abrasive grains used in GC3000 and GC2000 manufactured by Riken Corundum Co., Ltd.

GC3000 (polishing sheet surface roughness Ra: 0.83 μm)

GC2000 (polishing sheet surface roughness Ra: 1.45 μm)

Polishing sheet A (polishing sheet surface roughness Ra: 1.12 μm)

The time period for which the polishing was performed with the polishing sheet A was set to 20 seconds.

(Measurement of Polishing Depth L (μm))

The maximum height Rmax in accordance with JIS B0601 1982 was measured for the electrophotographic photosensitive member after the polishing with a surface roughness measuring instrument SURFCORDER SE3500 manufactured by Kosaka Laboratory Ltd. Measurement conditions were set as described below. The measurement was performed at 3 arbitrary sites in a 5-millimeter range, and the average of the measured values was adopted as the polishing depth L (μm). The polishing depth L of the electrophotographic photosensitive member after the surface polishing was 0.75 μm. In addition, in Examples 1-2 to 1-25 to be described later, all the polishing depths L of electrophotographic photosensitive members subjected to surface processing were 0.75 μm.

(Measurement CONDITIONS)

Detector: R 2 μm

Stylus: A diamond stylus having a measuring force of 0.7 mN

Filter: 2CR

Cut-off value: 0.08 mm

Measurement length: 2.5 mm

Feeding speed: 0.1 mm/sec

Examples 1-2 to 1-41 and Comparative Examples 1-1 to 1-6

Electrophotographic photosensitive members were each produced in the same manner as in Example 1-1 except that in the formation of the protective layer, the kind and number of parts by mass of the graft copolymer, and the average primary particle diameter of the polytetrafluoroethylene resin particles were changed to the kind and number of parts by mass of the graft copolymer, and the average primary particle diameter of the polytetrafluoroethylene resin particles shown in each of Table 3 and Table 4.

TABLE 3

| Example | Graft copolymer No. | Number of parts by mass of polymer | Average primary particle diameter of polytetrafluoroethylene resin particles [nm] | Content of polymer with respect to mass of polytetrafluoroethylene resin particles in surface layer [mass %] |
|---|---|---|---|---|
| Example 1-1 | 1 | 2.2 | 210 nm | 5.5% |
| Example 1-2 | 2 | 2.2 | 210 nm | 5.5% |
| Example 1-3 | 3 | 2.2 | 210 nm | 5.5% |
| Example 1-4 | 4 | 2.2 | 210 nm | 5.5% |
| Example 1-5 | 5 | 2.2 | 210 nm | 5.5% |
| Example 1-6 | 6 | 2.2 | 210 nm | 5.5% |
| Example 1-7 | 7 | 2.2 | 210 nm | 5.5% |
| Example 1-8 | 8 | 2.2 | 210 nm | 5.5% |
| Example 1-9 | 9 | 2.2 | 210 nm | 5.5% |
| Example 1-10 | 10 | 2.2 | 210 nm | 5.5% |
| Example 1-11 | 11 | 2.2 | 210 nm | 5.5% |
| Example 1-12 | 12 | 2.2 | 210 nm | 5.5% |
| Example 1-13 | 13 | 2.2 | 210 nm | 5.5% |
| Example 1-14 | 14 | 2.2 | 210 nm | 5.5% |
| Example 1-15 | 15 | 2.2 | 210 nm | 5.5% |
| Example 1-16 | 16 | 2.2 | 210 nm | 5.5% |
| Example 1-17 | 17 | 2.2 | 210 nm | 5.5% |
| Example 1-18 | 18 | 2.2 | 210 nm | 5.5% |
| Example 1-19 | 19 | 2.2 | 210 nm | 5.5% |
| Example 1-20 | 19 | 1.6 | 210 nm | 4.0% |
| Example 1-21 | 19 | 3.2 | 210 nm | 8.0% |
| Example 1-22 | 20 | 2.2 | 210 nm | 5.5% |
| Example 1-23 | 21 | 2.2 | 210 nm | 5.5% |
| Example 1-24 | 22 | 2.2 | 210 nm | 5.5% |
| Example 1-25 | 23 | 2.2 | 210 nm | 5.5% |
| Example 1-26 | 24 | 2.2 | 210 nm | 5.5% |
| Example 1-27 | 25 | 2.2 | 210 nm | 5.5% |
| Example 1-28 | 26 | 2.2 | 210 nm | 5.5% |
| Example 1-29 | 27 | 2.2 | 210 nm | 5.5% |
| Example 1-30 | 28 | 2.2 | 210 nm | 5.5% |
| Example 1-31 | 29 | 2.2 | 210 nm | 5.5% |
| Example 1-32 | 30 | 2.2 | 210 nm | 5.5% |
| Example 1-33 | 31 | 2.2 | 210 nm | 5.5% |
| Example 1-34 | 29 | 2.2 | 180 nm | 5.5% |
| Example 1-35 | 29 | 2.2 | 250 nm | 5.5% |
| Example 1-36 | 29 | 2.2 | 140 nm | 5.5% |
| Example 1-37 | 29 | 2.2 | 350 nm | 5.5% |
| Example 1-38 | 32 | 2.2 | 350 nm | 5.5% |
| Example 1-39 | 33 | 2.2 | 350 nm | 5.5% |
| Example 1-40 | 33 | 0.4 | 350 nm | 1.0% |
| Example 1-41 | 33 | 4.4 | 350 nm | 11.0% |

TABLE 4

| Comparative Example | Graft copolymer No. | Number of parts by mass of polymer | Average primary particle diameter of polytetrafluoroethylene resin particles [nm] | Content of polymer with respect to mass of polytetrafluoroethylene resin particles in surface layer [mass %] |
|---|---|---|---|---|
| Comparative Example 1-1 | 34 | 2.2 | 210 nm | 5.5% |
| Comparative Example 1-2 | 35 | 2.2 | 210 nm | 5.5% |
| Comparative Example 1-3 | 36 | 2.2 | 210 nm | 5.5% |
| Comparative Example 1-4 | 37 | 2.2 | 210 nm | 5.5% |
| Comparative Example 1-5 | 38 | 2.2 | 210 nm | 5.5% |
| Comparative Example 1-6 | 39 | 2.2 | 210 nm | 5.5% |

<Evaluation of Electrophotographic Photosensitive Member>

The electrophotographic photosensitive members obtained in Examples 1-1 to 1-41 and Comparative Examples 1-1 to 1-6 were evaluated as described below.

[Evaluation Apparatus 1-1]

An evaluation was performed by mounting each of the electrophotographic photosensitive members produced in Examples 1-1 to 1-41 and Comparative Examples 1-1 to 1-6 on a copying machine ImagePRESS C910 (product name) manufactured by Canon Inc.

More specifically, each of the produced electrophotographic photosensitive members was mounted on its process cartridge for a magenta color. The resultant was mounted on the station of the process cartridge for a magenta color, and the evaluation was performed.

The above-mentioned evaluation apparatus was placed under an environment having a temperature of 10° C. and a relative humidity of 10% RH, and each of the produced electrophotographic photosensitive members was mounted on its process cartridge for a magenta color. The resultant was mounted on the station of the process cartridge for a magenta color, and the evaluation was performed.

[Evaluation Apparatus 1-2]

An evaluation was performed by mounting each of the electrophotographic photosensitive members produced in Examples 1-1 to 1-41 and Comparative Examples 1-1 to 1-6 on a reconstructed machine of a copying machine ImagePRESS C910 (product name) manufactured by Canon Inc. The charging unit of the reconstructed machine is a charging unit of such a system as to apply a voltage obtained by superimposing an AC voltage on a DC voltage to a roller type contact charging member (charging roller), and the exposing unit thereof is an exposing unit of a laser image exposure system (wavelength: 680 nm).

More specifically, the above-mentioned evaluation apparatus was placed under an environment having a temperature of 10° C. and a relative humidity of 10% RH, and each of the produced electrophotographic photosensitive members was mounted on its process cartridge for a magenta color. The resultant was mounted on the station of the process cartridge for a magenta color, and the evaluation was performed.

With regard to charging conditions, a charging potential and the exposure amount of the exposing unit were adjusted so that a charging potential of −900 V and an exposure potential of −400 V were obtained.

The surface potential of each of the electrophotographic photosensitive members was measured by removing a cartridge for development from the above-mentioned evaluation apparatus and inserting a potential-measuring device into the resultant space. The potential-measuring device is formed by arranging a potential-measuring probe (product name: model 6000B-8, manufactured by Trek Japan) at the development position of the cartridge for development. In addition, the position of the potential-measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model, manufactured by Trek Japan).

(Initial Image Evaluation)

An image evaluation was performed by using the above-mentioned evaluation apparatus 1-1. An entirely solid white image was output on A4 size gloss paper, and the number of image defects due to a dispersion failure in the area of the output image corresponding to one round of each of the electrophotographic photosensitive members, that is, black spots was visually evaluated in accordance with the following evaluation ranks. The area corresponding to one round of the electrophotographic photosensitive member is a rectangular region measuring 297 mm, which is the length of the long side of the A4 paper, in a longitudinal direction and 94.2 mm, which is one round of the electrophotographic photosensitive member, in a lateral direction. In addition, in the present invention, ranks A, B, C, and D were the levels at which the effect of the present invention was obtained, and out of the ranks, the rank A was judged to be an excellent level. Meanwhile, a rank E was judged to be the level at which the effect of the present invention was not obtained.

A: No black spot is present.

B: The number of black spots each having a diameter of less than 1.5 mm is from 1 to 3, and no black spot having a diameter of 1.5 mm or more is present.

C: The number of black spots each having a diameter of less than 1.5 mm is from 1 to 3, and the number of black spots each having a diameter of 1.5 mm or more is 1 or 2.

D: The number of black spots each having a diameter of less than 1.5 mm is 4 or 5, and the number of black spots each having a diameter of 1.5 mm or more is 2 or less.

E: The number of black spots each having a diameter of less than 1.5 mm is 6 or more, or the number of black spots each having a diameter of 1.5 mm or more is 3 or more.

The results of the evaluations performed as described above are shown in Table 5.

(Ghost Evaluation)

Figure 5A:
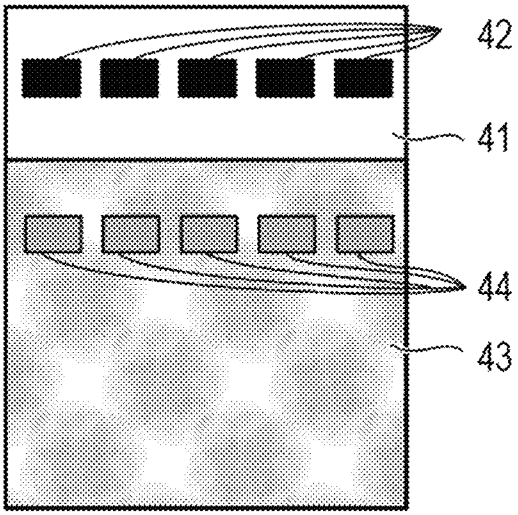
FIG. 5A is a schematic view for illustrating an image signal to be used in a ghost evaluation.

A ghost evaluation was performed by repeatedly outputting an image with the above-mentioned evaluation apparatus 1-1 as described below, and then measuring a ghost potential with the above-mentioned evaluation apparatus 1-2. The cartridge of the evaluation apparatus 1-1 including each of the electrophotographic photosensitive members was mounted on the evaluation apparatus 1-1, and a monochromatic letter image having a print percentage of 1% was repeatedly formed on 25,000 sheets of A4 size plain paper with the apparatus. Next, the electrophotographic photosensitive member that had been repeatedly used was mounted on the cartridge of the evaluation apparatus 1-2, and the cartridge was mounted on the evaluation apparatus 1-2. The ghost potential was measured by inputting a signal for outputting an image illustrated in FIG. 5A and FIG. 5B into the evaluation apparatus 1-2. The image for a ghost evaluation is an image obtained by outputting quadrangular solid images (black images) in the white background (white image) of the leading end portion of an image as illustrated in FIG. 5A, and then producing a one-dot knight-jump pattern image illustrated in FIG. 5B. In the evaluation apparatus 1-2, the above-mentioned potential-measuring probe was fixed so as to be located at the position of each of the quadrangular solid images (black images) in the signal for outputting the image illustrated in FIG. 5A and FIG. 5B. A bias to be applied was set so that the dark portion potential of the non-exposed portion of the electrophotographic photosensitive member became −900 V, and the exposure amount of the exposing unit of the evaluation apparatus 1-2 was adjusted so that the exposure potential of the photosensitive member became −400 V.

Figure 5B:
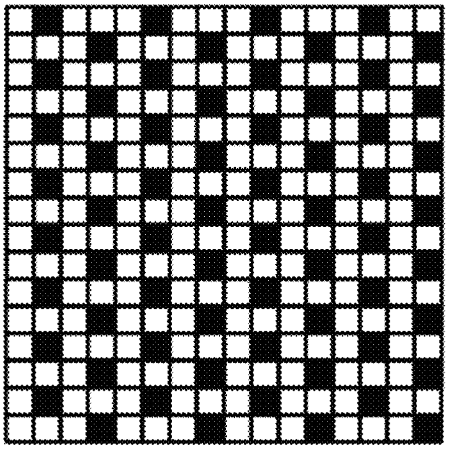
FIG. 5B is a schematic view for illustrating the image signal to be used in the ghost evaluation.

The signal for outputting the image illustrated in FIG. 5A and FIG. 5B forms an electrostatic latent image corresponding to the image illustrated in FIG. 5A and FIG. 5B on the surface of the photosensitive member. In the electrostatic latent image corresponding to the image illustrated in FIG. 5A and FIG. 5B, a potential difference between the potential of a ghost image-occurring region in a knight-jump pattern image-formed region and a potential in a region except the ghost image-occurring region in the knight-jump pattern image-formed region was defined as the ghost potential.

Similarly, the image was repeatedly formed on 60,000 sheets of the paper and on 80,000 sheets of the paper, and then ghost potential evaluations were performed. The ghost potential is desirably as low as possible, and as the potential becomes lower, the effect of the present invention is obtained to a larger extent.

The results of the evaluations performed as described above are shown in Table 5.

TABLE 5

| | Initial image | Ghost evaluation Potential [V] | | |
|---|---|---|---|---|
| | evaluation | 25,000 sheets | 60,000 sheets | 80,000 sheets |
| Example 1-1 | A | 6 | 6 | 6 |
| Example 1-2 | A | 6 | 6 | 6 |
| Example 1-3 | A | 6 | 6 | 6 |
| Example 1-4 | A | 6 | 6 | 6 |
| Example 1-5 | A | 6 | 6 | 6 |
| Example 1-6 | A | 6 | 6 | 6 |
| Example 1-7 | A | 6 | 6 | 6 |
| Example 1-8 | B | 6 | 6 | 7 |
| Example 1-9 | B | 6 | 6 | 7 |
| Example 1-10 | A | 6 | 6 | 6 |
| Example 1-11 | B | 6 | 7 | 8 |
| Example 1-12 | A | 6 | 7 | 8 |
| Example 1-13 | A | 6 | 7 | 8 |
| Example 1-14 | A | 6 | 7 | 8 |
| Example 1-15 | A | 6 | 7 | 8 |
| Example 1-16 | A | 6 | 7 | 8 |
| Example 1-17 | A | 6 | 7 | 8 |
| Example 1-18 | A | 6 | 8 | 11 |
| Example 1-19 | A | 6 | 8 | 10 |
| Example 1-20 | A | 6 | 8 | 10 |
| Example 1-21 | A | 6 | 8 | 10 |
| Example 1-22 | A | 7 | 8 | 10 |
| Example 1-23 | A | 7 | 8 | 10 |
| Example 1-24 | A | 7 | 8 | 10 |
| Example 1-25 | A | 7 | 8 | 11 |
| Example 1-26 | A | 7 | 8 | 11 |
| Example 1-27 | A | 7 | 8 | 11 |
| Example 1-28 | A | 8 | 9 | 12 |
| Example 1-29 | A | 8 | 9 | 12 |
| Example 1-30 | A | 8 | 9 | 12 |
| Example 1-31 | A | 8 | 9 | 12 |
| Example 1-32 | A | 8 | 9 | 12 |
| Example 1-33 | A | 9 | 10 | 12 |
| Example 1-34 | A | 8 | 9 | 12 |
| Example 1-35 | A | 8 | 9 | 12 |
| Example 1-36 | C | 8 | 9 | 12 |
| Example 1-37 | B | 8 | 10 | 12 |
| Example 1-38 | D | 8 | 10 | 12 |
| Example 1-39 | B | 9 | 10 | 12 |
| Example 1-40 | D | 10 | 11 | 12 |
| Example 1-41 | C | 9 | 10 | 12 |
| Comparative Example 1-1 | C | 19 | 21 | 23 |
| Comparative Example 1-2 | E | 17 | 18 | 19 |
| Comparative Example 1-3 | E | 17 | 18 | 19 |
| Comparative Example 1-4 | C | 21 | 21 | 25 |
| Comparative Example 1-5 | C | 22 | 24 | 27 |
| Comparative Example 1-6 | C | 20 | 21 | 25 |

Example 2-1

(Support 2)

A product obtained by cutting a cylindrical aluminum cylinder (JIS-A3003, aluminum alloy, outer diameter: 30 mm, length: 357.5 mm, wall thickness: 0.7 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off After that, the cleaned product was further subjected to ultrasonic cleaning in pure water to be subjected to degreasing treatment. The resultant was used as a support 2.

(Undercoat Layer 2)

60 Parts of zinc oxide particles (average particle diameter: 70 nm, specific surface area: 15 $m^2/g$) were stirred and mixed with 500 parts of tetrahydrofuran, and 0.75 part of a silane coupling agent (compound name: N-2-(aminoethyl)-3-aminopropyltrimethoxysilane, product name: KBM-603, manufactured by Shin-Etsu Chemical Co., Ltd.) was added to the mixture, followed by stirring for 2 hours. After that, tetrahydrofuran was evaporated under reduced pressure, and the residue was heated and dried at 120° C. for 3 hours to provide surface-treated zinc oxide particles.

Subsequently, 25 parts of a butyral resin (product name: BM-1, manufactured by Sekisui Chemical Company, Limited) serving as a polyol and 22.5 parts of a blocked isocyanate (product name: SUMIDUR BL-3173, manufactured by Sumitomo Bayer Urethane Co., Ltd.) were dissolved in 142 parts of methyl ethyl ketone. 100 Parts of the surface-treated zinc oxide particles and 1 part of anthraquinone were added to the solution, and the materials were dispersed with a sand mill using glass beads each having a diameter of 1 mm for 5 hours.

After the dispersion treatment, 0.008 part of dioctyltin dilaurate and 6.5 parts of silicone resin particles (TOSPEARL 145, manufactured by GE Toshiba Silicone Co., Ltd.) were added to the resultant, and the mixture was stirred to prepare a coating liquid for an undercoat layer.

The resultant coating liquid for an undercoat layer was applied onto the above-mentioned support 2 by dip coating to form a coating film, and the coating film was dried at 190° C. for 24 minutes to form an undercoat layer 2 having a thickness of 15 μm.

(Charge-generating Layer 2)

Next, 15 parts of a chlorogallium phthalocyanine crystal having strong diffraction peaks at Bragg angles)(20±0.2° of at least 7.4°, 16.6°, 25.5°, and 28.3° for a CuKα characteristic X-ray, 10 parts of a vinyl chloride-vinyl acetate copolymer resin (VMCH, manufactured by Union Carbide Japan K. K.), and 300 parts of n-butyl alcohol were mixed, and the mixture was subjected to dispersion treatment with a sand mill using glass beads each having a diameter of 1 mm for 4 hours to prepare a coating liquid for a charge-generating layer.

The coating liquid for a charge-generating layer was applied onto the undercoat layer 2 by dip coating, and the resultant coating film was dried at 150° C. for 5 minutes to form a charge-generating layer 2 having a thickness of 0.2 μm.

(Charge-Transporting Layer 2)

Next, 10 parts of polytetrafluoroethylene resin particles (average primary particle diameter: 210 nm, average circularity: 0.85), 0.50 part of the above-mentioned graft copolymer 1, and 20 parts of tetrahydrofuran were stirred and mixed for 48 hours while the temperature of the mixed liquid was kept at 20° C. Thus, a prepared liquid A was obtained.

Next, 45.0 parts of N,N'-bis(3-methylphenyl)-N,N'-diphenylbenzidine, 55.0 parts of a bisphenol Z type polycarbonate resin (viscosity-average molecular weight: 40,000), and 0.30 part of 2,6-di-t-butyl-4-methylphenol serving as an antioxidant were mixed, and 280 parts of tetrahydrofuran was mixed and dissolved in the mixture to provide a prepared liquid B.

The prepared liquid A was added to the prepared liquid B, and the liquids were stirred and mixed. After that, the mixture was passed through a high-pressure dispersing machine (product name: MICROFLUIDIZER M-110EH, manufactured by Microfluidics, USA) to provide a dispersion liquid.

After that, a fluorine-modified silicone oil (product name: FL-100, manufactured by Shin-Etsu Silicone) was added to the dispersion liquid so that its concentration became 5 ppm. The mixture was filtered with a polyflon filter (product name: PF-040, manufactured by Advantec Toyo Kaisha, Ltd.) to prepare a coating liquid for a charge-transporting layer.

The coating liquid for a charge-transporting layer was applied onto the charge-generating layer 2 by dip coating to form a coating film, and the resultant coating film was dried at 135° C. for 40 minutes to form a charge-transporting layer 2 having a thickness of 33

Thus, an electrophotographic photosensitive member was produced.

Examples 2-2 to 2-41 and Comparative Examples 2-1 to 2-6

Electrophotographic photosensitive members were each produced in the same manner as in Example 2-1 except that in the formation of the charge-transporting layer, the kind and number of parts by mass of the graft copolymer, and the average primary particle diameter of the polytetrafluoroethylene resin particles were changed to the kind and number of parts by mass of the graft copolymer, and the average primary particle diameter of the polytetrafluoroethylene resin particles shown in each of Table 6 and Table 7.

TABLE 6

| Example | Graft copolymer No. | Number of parts by mass of polymer | Average primary particle diameter of polytetrafluoroethylene resin particles [nm] | Content of polymer with respect to mass of polytetrafluoroethylene resin particles in surface layer [mass %] |
|---|---|---|---|---|
| Example 2-1 | 1 | 0.50 | 210 nm | 5.0% |
| Example 2-2 | 2 | 0.50 | 210 nm | 5.0% |
| Example 2-3 | 3 | 0.50 | 210 nm | 5.0% |
| Example 2-4 | 4 | 0.50 | 210 nm | 5.0% |
| Example 2-5 | 5 | 0.50 | 210 nm | 5.0% |
| Example 2-6 | 6 | 0.50 | 210 nm | 5.0% |
| Example 2-7 | 7 | 0.50 | 210 nm | 5.0% |
| Example 2-8 | 8 | 0.50 | 210 nm | 5.0% |
| Example 2-9 | 9 | 0.50 | 210 nm | 5.0% |
| Example 2-10 | 10 | 0.50 | 210 nm | 5.0% |
| Example 2-11 | 11 | 0.50 | 210 nm | 5.0% |
| Example 2-12 | 12 | 0.50 | 210 nm | 5.0% |
| Example 2-13 | 13 | 0.50 | 210 nm | 5.0% |

TABLE 6-continued

| Example | Graft copolymer No. | Number of parts by mass of polymer | Average primary particle diameter of polytetrafluoroethylene resin particles [nm] | Content of polymer with respect to mass of polytetrafluoroethylene resin particles in surface layer [mass %] |
|---|---|---|---|---|
| Example 2-14 | 14 | 0.50 | 210 nm | 5.0% |
| Example 2-15 | 15 | 0.50 | 210 nm | 5.0% |
| Example 2-16 | 16 | 0.50 | 210 nm | 5.0% |
| Example 2-17 | 17 | 0.50 | 210 nm | 5.0% |
| Example 2-18 | 18 | 0.50 | 210 nm | 5.0% |
| Example 2-19 | 19 | 0.50 | 210 nm | 5.0% |
| Example 2-20 | 19 | 0.40 | 210 nm | 4.0% |
| Example 2-21 | 19 | 0.80 | 210 nm | 8.0% |
| Example 2-22 | 20 | 0.50 | 210 nm | 5.0% |
| Example 2-23 | 21 | 0.50 | 210 nm | 5.0% |
| Example 2-24 | 22 | 0.50 | 210 nm | 5.0% |
| Example 2-25 | 23 | 0.50 | 210 nm | 5.0% |
| Example 2-26 | 24 | 0.50 | 210 nm | 5.0% |
| Example 2-27 | 25 | 0.50 | 210 nm | 5.0% |
| Example 2-28 | 26 | 0.50 | 210 nm | 5.0% |
| Example 2-29 | 27 | 0.50 | 210 nm | 5.0% |
| Example 2-30 | 28 | 0.50 | 210 nm | 5.0% |
| Example 2-31 | 29 | 0.50 | 210 nm | 5.0% |
| Example 2-32 | 30 | 0.50 | 210 nm | 5.0% |
| Example 2-33 | 31 | 0.50 | 210 nm | 5.0% |
| Example 2-34 | 29 | 0.50 | 180 nm | 5.0% |
| Example 2-35 | 29 | 0.50 | 250 nm | 5.0% |
| Example 2-36 | 29 | 0.50 | 140 nm | 5.0% |
| Example 2-37 | 29 | 0.50 | 350 nm | 5.0% |
| Example 2-38 | 32 | 0.50 | 350 nm | 5.0% |
| Example 2-39 | 33 | 0.50 | 350 nm | 5.0% |
| Example 2-40 | 33 | 0.10 | 350 nm | 1.0% |
| Example 2-41 | 33 | 1.10 | 350 nm | 11.0% |

TABLE 7

| Comparative Example | Graft copolymer No. | Number of parts by mass of polymer | Average primary particle diameter of polytetrafluoroethylene resin particles [nm] | Content of polymer with respect to mass of polytetrafluoroethylene resin particles in surface layer [mass %] |
|---|---|---|---|---|
| Comparative Example 2-1 | 34 | 0.50 | 210 nm | 5.0% |
| Comparative Example 2-2 | 35 | 0.50 | 210 nm | 5.0% |
| Comparative Example 2-3 | 36 | 0.50 | 210 nm | 5.0% |
| Comparative Example 2-4 | 37 | 0.50 | 210 nm | 5.0% |
| Comparative Example 2-5 | 38 | 0.50 | 210 nm | 5.0% |
| Comparative Example 2-6 | 39 | 0.50 | 210 nm | 5.0% |

<Evaluation of Electrophotographic Photosensitive Member>

Electrophotographic photosensitive members produced with the electrophotographic photosensitive members obtained in Examples 2-1 to 2-41 and Comparative Examples 2-1 to 2-6 were evaluated as described below.

[Evaluation Apparatus 2-1]

An evaluation was performed by mounting each of the electrophotographic photosensitive members produced in Examples 2-1 to 2-41 and Comparative Examples 2-1 to 2-6 on a copying machine imageRUNNER ADVANCE DX C3835F (product name) manufactured by Canon Inc.

More specifically, the above-mentioned evaluation apparatus was placed under an environment having a temperature of 10° C. and a relative humidity of 10% RH, and each of the produced electrophotographic photosensitive members was mounted on its process cartridge for a magenta color. The resultant was mounted on the station of the process cartridge for a magenta color, and the evaluation was performed.

[Evaluation Apparatus 2-2]

An evaluation was performed by mounting each of the electrophotographic photosensitive members produced in Examples 2-1 to 2-41 and Comparative Examples 2-1 to 2-6 on a reconstructed machine of a copying machine imageRUNNER ADVANCE DX C3835F (product name) manufactured by Canon Inc. (its charging unit was such a system as to apply a DC voltage to a roller type contact charging member (charging roller), and its exposing unit was a laser image exposure system (wavelength: 780 nm)). More specifically, the above-mentioned evaluation apparatus was placed under an environment having a temperature of 10° C. and a relative humidity of 10% RH, and each of the produced electrophotographic photosensitive members was mounted on its process cartridge for a magenta color. The resultant was mounted on the station of the process cartridge for a magenta color, and the evaluation was performed.

The surface potential of each of the electrophotographic photosensitive members was measured by removing a cartridge for development from the above-mentioned evaluation apparatus and inserting a potential-measuring device into the resultant space. The potential-measuring device is formed by arranging a potential-measuring probe (product name: model 6000B-8, manufactured by Trek Japan) at the development position of the cartridge for development. The position of the potential-measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model 344, manufactured by Trek Japan).

(Initial Image Evaluation)

Image evaluations were performed by using the above-mentioned evaluation apparatus 2-1. An entirely solid white image was output on A4 size gloss paper, and the number of image defects due to a dispersion failure in the area of the output image corresponding to one round of each of the electrophotographic photosensitive members, that is, black spots was visually evaluated in accordance with the following evaluation ranks. The area corresponding to one round of the electrophotographic photosensitive member is a rectangular region measuring 297 mm, which is the length of the long side of the A4 paper, in a longitudinal direction and 94.2 mm, which is one round of the electrophotographic photosensitive member, in a lateral direction. In addition, in the present invention, ranks A, B, C, and D were the levels at which the effect of the present invention was obtained, and out of the ranks, the rank A was judged to be an excellent level. Meanwhile, a rank E was judged to be the level at which the effect of the present invention was not obtained.

A: No black spot is present.

B: The number of black spots each having a diameter of less than 1.5 mm is from 1 to 3, and no black spot having a diameter of 1.5 mm or more is present.

C: The number of black spots each having a diameter of less than 1.5 mm is from 1 to 3, and the number of black spots each having a diameter of 1.5 mm or more is 1 or 2.

D: The number of black spots each having a diameter of less than 1.5 mm is 4 or 5, and the number of black spots each having a diameter of 1.5 mm or more is 2 or less.

E: The number of black spots each having a diameter of less than 1.5 mm is 6 or more, or the number of black spots each having a diameter of 1.5 mm or more is 3 or more.

The results of the evaluations performed as described above are shown in Table 7.

(Ghost Evaluation)

A ghost evaluation was performed by repeatedly outputting an image with the above-mentioned evaluation apparatus 2-1 as described below, and then measuring a ghost potential with the above-mentioned evaluation apparatus 2-2.

The cartridge of the evaluation apparatus 2-1 including each of the electrophotographic photosensitive members was mounted on the evaluation apparatus 2-1, and a monochromatic letter image having a print percentage of 1% was repeatedly formed on 20,000 sheets of A4 size plain paper with the apparatus. Next, the electrophotographic photosensitive member that had been repeatedly used was mounted on the cartridge of the evaluation apparatus 2-2, and the cartridge was mounted on the evaluation apparatus 2-2. The ghost potential was measured by inputting a signal for outputting an image for a ghost evaluation illustrated in FIG. 5A and FIG. 5B into the evaluation apparatus 2-2. The image for a ghost evaluation is an image obtained by outputting quadrangular solid images (black images) in the white background (white image) of the leading end portion of an image as illustrated in FIG. 5A, and then producing a one-dot knight-jump pattern image illustrated in FIG. 5B. In the evaluation apparatus 2-2, the above-mentioned potential-measuring probe was fixed so as to be located at the position of each of the quadrangular solid images (black images) in the signal for outputting the image illustrated in FIG. 5A and FIG. 5B.

A bias to be applied was set so that the dark portion potential of the non-exposed portion of the electrophotographic photosensitive member became −500 V, and the light quantity of laser light was set to 0.30 μJ/cm$^2$. The signal for outputting the image illustrated in FIG. 5A and FIG. 5B forms an electrostatic latent image corresponding to the image illustrated in FIG. 5A and FIG. 5B on the surface of the photosensitive member. In the electrostatic latent image corresponding to the image illustrated in FIG. 5A and FIG. 5B, a potential difference between the potential of a ghost image-occurring region in a knight-jump pattern image-formed region and a potential in a region except the ghost image-occurring region in the knight-jump pattern image-formed region was defined as the ghost potential.

Similarly, the image was repeatedly formed on 40,000 sheets of the paper and on 55,000 sheets of the paper, and then ghost potential evaluations were performed. The ghost potential is desirably as low as possible, and as the potential becomes lower, the effect of the present invention is obtained to a larger extent.

The results of the evaluations performed as described above are shown in Table 8.

TABLE 8

| | | Ghost evaluation Potential [V] | | |
|---|---|---|---|---|
| | Initial image evaluation | 20,000 sheets | 40,000 sheets | 55,000 sheets |
| Example 2-1 | A | 5 | 5 | 5 |
| Example 2-2 | A | 5 | 5 | 5 |
| Example 2-3 | A | 5 | 5 | 5 |
| Example 2-4 | A | 5 | 5 | 5 |
| Example 2-5 | A | 5 | 5 | 5 |
| Example 2-6 | A | 5 | 5 | 5 |
| Example 2-7 | A | 5 | 5 | 5 |
| Example 2-8 | B | 5 | 5 | 6 |
| Example 2-9 | B | 5 | 5 | 6 |
| Example 2-10 | A | 5 | 5 | 5 |
| Example 2-11 | B | 5 | 6 | 7 |
| Example 2-12 | A | 5 | 6 | 7 |
| Example 2-13 | A | 5 | 6 | 7 |
| Example 2-14 | A | 5 | 6 | 7 |
| Example 2-15 | A | 5 | 6 | 7 |
| Example 2-16 | A | 5 | 6 | 7 |
| Example 2-17 | A | 5 | 6 | 7 |
| Example 2-18 | A | 5 | 7 | 9 |
| Example 2-19 | A | 5 | 7 | 8 |
| Example 2-20 | A | 5 | 7 | 8 |

TABLE 8-continued

| | Initial image evaluation | Ghost evaluation Potential [V] 20,000 sheets | 40,000 sheets | 55,000 sheets |
|---|---|---|---|---|
| Example 2-21 | A | 5 | 7 | 8 |
| Example 2-22 | A | 6 | 7 | 8 |
| Example 2-23 | A | 6 | 7 | 8 |
| Example 2-24 | A | 6 | 7 | 8 |
| Example 2-25 | A | 6 | 7 | 9 |
| Example 2-26 | A | 6 | 7 | 9 |
| Example 2-27 | A | 6 | 7 | 9 |
| Example 2-28 | A | 7 | 8 | 10 |
| Example 2-29 | A | 7 | 8 | 10 |
| Example 2-30 | A | 7 | 8 | 10 |
| Example 2-31 | A | 7 | 8 | 10 |
| Example 2-32 | A | 7 | 8 | 10 |
| Example 2-33 | A | 8 | 9 | 10 |
| Example 2-34 | A | 7 | 8 | 10 |
| Example 2-35 | A | 7 | 8 | 10 |
| Example 2-36 | C | 7 | 8 | 10 |
| Example 2-37 | B | 7 | 9 | 10 |
| Example 2-38 | D | 7 | 9 | 10 |
| Example 2-39 | B | 8 | 9 | 10 |
| Example 2-40 | D | 9 | 10 | 10 |
| Example 2-41 | C | 8 | 9 | 10 |
| Comparative Example 2-1 | C | 17 | 19 | 19 |
| Comparative Example 2-2 | E | 15 | 16 | 16 |
| Comparative Example 2-3 | E | 15 | 16 | 16 |
| Comparative Example 2-4 | C | 19 | 19 | 21 |
| Comparative Example 2-5 | C | 20 | 22 | 24 |
| Comparative Example 2-6 | C | 18 | 19 | 21 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020568, filed Feb. 14, 2022, which is hereby incorporated by reference herein in its entirety.

What is claimed is:

1. An electrophotographic photosensitive member, comprising:

a surface layer, the surface layer comprising a fluorine atom-containing resin particle, a binder material and a polymer A, wherein polymer A is obtained by polymerizing a composition comprising compounds according to formulae (1), (2) and (3)

(1)

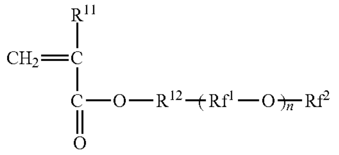

(2)

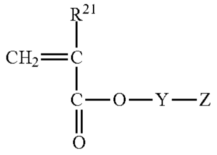

-continued (3)

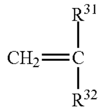

where $R^{11}$ represents a hydrogen atom or a methyl group, $R^{12}$ represents a single bond, a methylene group or an ethylene group, $Rf^1$s independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, "n" represents an integer of 1 to 3, and when "n" represents 2 or 3, "n" $Rf^1$s may be identical to or different from each other, $R^{21}$ represents a hydrogen atom or a methyl group, Y represents a divalent organic group, Z represents a polymer moiety, $R^{31}$ represents a hydrogen atom or a methyl group, and $R^{32}$ represents a cyano group.

2. The electrophotographic photosensitive member according to claim 1, wherein the compound according to formula (2) is represented by formula (5)

(5)

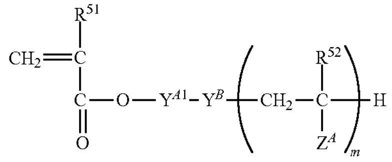

where $Y^{A1}$ represents an unsubstituted alkylene group, $Y^B$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds selected from these groups and bonds, and —O— or —S—, or a single bond, $R^{51}$ and $R^{52}$ independently represent a hydrogen atom or a methyl group, "m" represents an integer of 25 to 150, and $Z^A$ represents a cyano group, a phenyl group or a structure represented by formula (2A)

(2A)

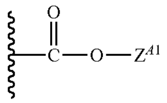

where $Z^{A1}$ represents an alkyl group having 1 to 4 carbon atoms.

3. The electrophotographic photosensitive member according to claim 2, wherein $—Y^{A1}—Y^B—$ is $—Y^{A1}—(Y^{A2})_b—(Y^{A3})_c—(Y^{A4})_d—(Y_{A5})_e—(Y^{A6})_f—$ where $Y^{A1}$ represents an unsubstituted alkylene group, $YA^2$ represents a methylene group substituted with at least one member selected from the group consisting of a hydroxy group and a halogen atom, $YA^3$ represents an unsubstituted alkylene group, $YA^4$ represents an ester bond, an amide bond or a urethane bond, $YA^5$ represents an unsubstituted alkylene group, $YA^6$ represents an oxygen atom or a sulfur atom, and "b", "c", "d", "e", and "f" independently represent 0 or 1.

4. The electrophotographic photosensitive member according to claim 1, wherein a total number of carbon atoms of "n" $Rf^1$s and $Rf^2$ is 5 to 8.

5. The electrophotographic photosensitive member according to claim 1, wherein "n" is 1 or 2.

6. The electrophotographic photosensitive member according to claim 1, wherein each $Rf^1$ independently represents a perfluoroalkylene group having 2 or 3 carbon atoms, or a perfluoroalkylidene group having 2 or 3 carbon atoms, and $Rf^2$ represents a perfluoroalkyl group having 2 or 3 carbon atoms.

7. The electrophotographic photosensitive member according to claim 1, wherein a content of the compound represented by formula (1) is 5 to 95 mol % with respect to a total content of the compounds represented by formulae (1), (2) and (3) in the composition, and a content of the compound represented by formula (3) is 0.10 to 1.0 mol % with respect to the content of the compound represented by formula (1) in the composition.

8. The electrophotographic photosensitive member according to claim 7, wherein the content of the compound represented by formula (3) is 0.10 to 0.50 mol % with respect to the content of the compound represented by formula (1) in the composition.

9. The electrophotographic photosensitive member according to claim 1, wherein the polymer A is obtained by polymerizing only the compounds represented by formulae (1), (2) and (3).

10. The electrophotographic photosensitive member according to claim 1, wherein a content of polymer A in the surface layer is 2 to 10 mass % with respect to a mass of the fluorine atom-containing resin particle in the surface layer.

11. The electrophotographic photosensitive member according to claim 1, wherein polymer A has a weight-average molecular weight of 16,000 to 100,000.

12. The electrophotographic photosensitive member according to claim 1, wherein a content of the fluorine atom-containing resin particle in the surface layer is 5 to to 40 mass % with respect to a total mass of the surface layer.

13. The electrophotographic photosensitive member according to claim 1, wherein the fluorine atom-containing resin particle is a polytetrafluoroethylene resin particle, and an arithmetic average of long diameters of primary particles is 150 to 300 nm measured observing a section of the surface layer from a secondary electron image of the polytetrafluoroethylene resin particle obtained with a scanning electron microscope.

14. A process cartridge, comprising:

at least one unit selected from the group consisting of a charging unit, a developing unit, a transfer unit and a cleaning unit;

the process cartridge integrally supporting an electrophotographic photosensitive member and the at least one unit, and being detachably attachable to a main body of an electrophotographic apparatus;

the electrophotographic photosensitive member comprising a surface layer, the surface layer comprising a fluorine atom-containing resin particle, a binder material and a polymer A, wherein polymer A is obtained by polymerizing a composition comprising compounds according to formulae (1), (2) and (3)

(1)

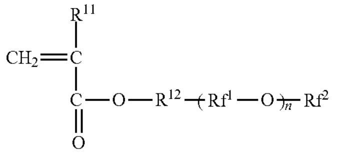

(2)

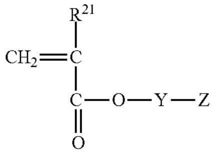

(3)

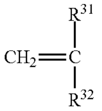

where $R^{11}$ represents a hydrogen atom or a methyl group, $R^{12}$ represents a single bond, a methylene group or an ethylene group, $Rf^1$s independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, "n" represents an integer of 1 to 3, and when "n" represents 2 or 3, "n" $Rf^1$s may be identical to or different from each other, $R^{21}$ represents a hydrogen atom or a methyl group, Y represents a divalent organic group, Z represents a polymer moiety, $R^{31}$ represents a hydrogen atom or a methyl group, and $R^{32}$ represents a cyano group.

15. An electrophotographic apparatus, comprising:

a charging unit;

an exposing unit;

a developing unit;

a transfer unit; and an electrophotographic photosensitive member including a surface layer, the surface layer comprising a fluorine atom-containing resin particle, a binder material and a polymer A, wherein polymer A is obtained by polymerizing a composition comprising compounds according to formulae (1), (2) and (3)

(1)

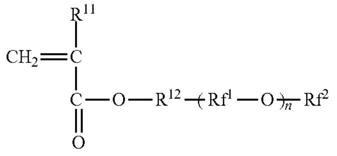

-continued (2)

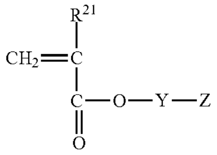

(3)

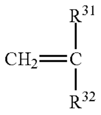

where $R^{11}$ represents a hydrogen atom or a methyl group, $R^{12}$ represents a single bond, a methylene group or an ethylene group, $Rf^1$s independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, "n" represents an integer of 1 to 3, and when "n" represents 2 or 3, "n" $Rf^1$s may be identical to or different from each other, $R^{21}$ represents a hydrogen atom or a methyl group, Y represents a divalent organic group, Z represents a polymer moiety, $R^{31}$ represents a hydrogen atom or a methyl group, and $R^{32}$ represents a phenyl group, a cyano group.

16. A method of producing an electrophotographic photosensitive member including a surface layer, the method comprising the steps of:

preparing a coating liquid comprising (i) a fluorine atom-containing resin particle, (ii) at least one member selected from the group consisting of a binder material and a raw material for the binder material, and (iii) a polymer A obtained by copolymerizing compounds according to formulae (1), (2) and (3); and forming the surface layer by forming a coating film of the coating liquid, and drying and/or curing the coating film (1)

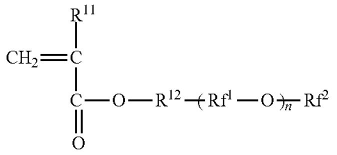

(2)

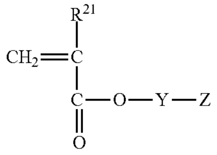

(3)

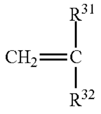

where $R^{11}$ represents a hydrogen atom or a methyl group, $R^{12}$ represents a single bond, a methylene group or an ethylene group, $Rf^1$s independently represent a perfluoroalkylene group having 1 to 5 carbon atoms, or a perfluoroalkylidene group having 1 to 5 carbon atoms, $Rf^2$ represents a perfluoroalkyl group having 1 to 5 carbon atoms, "n" represents an integer of 1 to 3, and when "n" represents 2 or 3, "n" $Rf^1$s may be identical to or different from each other, $R^{21}$ represents a hydrogen atom or a methyl group, Y represents a divalent organic group, Z represents a polymer moiety, $R^{31}$ represents a hydrogen atom or a methyl group, and $R^{32}$ represents a cyano group.

* * * * *